US009027218B2

(12) United States Patent (10) Patent No.: US 9,027,218 B2
Slettemoen (45) Date of Patent: May 12, 2015

(54) OPTO-MECHANICAL POSTION FINDER

(76) Inventor: Gudmunn Slettemoen, Klæbu (NO)

(*) Notice: Subject to any disclaimer, the term of this patent is extended or adjusted under 35 U.S.C. 154(b) by 2101 days.

(21) Appl. No.: 12/066,183

(22) PCT Filed: Sep. 13, 2005

(86) PCT No.: PCT/NO2005/000336
§ 371 (c)(1),
(2), (4) Date: Apr. 22, 2008

(87) PCT Pub. No.: WO2007/032681
PCT Pub. Date: Mar. 22, 2007

(65) Prior Publication Data
US 2008/0250625 A1    Oct. 16, 2008

(51) Int. Cl.
| | | |
|---|---|---|
| B23Q 17/00 | (2006.01) |
| G01B 11/14 | (2006.01) |
| G01L 9/00 | (2006.01) |
| G06T 17/00 | (2006.01) |
| G01B 21/04 | (2006.01) |
| B23Q 17/22 | (2006.01) |
| B23Q 17/24 | (2006.01) |

(52) U.S. Cl.
CPC .............. *G01B 21/045* (2013.01); *B23Q 17/22* (2013.01); *B23Q 17/24* (2013.01)

(58) Field of Classification Search
USPC .............. 29/407.04, 407.05, 407.09, 407.01; 73/705; 356/614, 615, 620; 345/419, 345/420, 424
See application file for complete search history.

(56) References Cited

U.S. PATENT DOCUMENTS

| | | | | |
|---|---|---|---|---|
| 4,409,718 A | * | 10/1983 | Pryor ......................... | 29/407.04 |
| 5,521,036 A | * | 5/1996 | Iwamoto et al. ................. | 430/22 |
| 5,825,017 A |   | 10/1998 | Pryor |  |
| 5,871,391 A | * | 2/1999 | Pryor ................................ | 451/9 |
| 5,915,033 A | * | 6/1999 | Tanigawa et al. ............. | 382/106 |

(Continued)

FOREIGN PATENT DOCUMENTS

JP     2005064371     3/2005

OTHER PUBLICATIONS

Optic Methods for Distance and Displacement Measurments; Berkovic et al.; Advances in Optics and Photonics 4; Sep. 11, 2012; pp. 441-471.*

(Continued)

*Primary Examiner* — Jermie Cozart
*Assistant Examiner* — Bayan Salone
(74) *Attorney, Agent, or Firm* — Volpe and Koenig, P.C.

(57) ABSTRACT

An apparatus and method for finding part position relations of parts of mechanical and opto-mechanical machining and quality control systems, and for recognizing these parts, is disclosed. The present invention relies on optical contactless sensing technology, with recording of optical fiducial patterns and therefrom determining positions close to the work positions without physical contact. Part positions of machines are determined by associating or mechanically integrating fiducial patterns (1) with key parts, and optically detecting the images of these patterns. Part positions and displacements according to given part position finder (6) strategies are found, by associating fiducial pattern images (14) and machine position data (17) to parts that are members of a part geometry relation (15), and under part displacement constraints (16), finding given part positions or displacements (18). Using fiducial patterns (1), identification and recognition of work pieces, work holders, work tools, gauge tools, and machine parts in general is enabled.

46 Claims, 5 Drawing Sheets

(56) References Cited

U.S. PATENT DOCUMENTS

| | | | |
|---|---|---|---|
| 5,917,726 A * | 6/1999 | Pryor | 700/95 |
| 6,056,041 A * | 5/2000 | Caron et al. | 164/455 |
| 6,301,007 B1 * | 10/2001 | Hanlon et al. | 356/400 |
| 6,415,191 B1 * | 7/2002 | Pryor | 700/95 |
| 6,496,270 B1 * | 12/2002 | Kelley et al. | 356/602 |
| 6,563,564 B2 * | 5/2003 | de Mol et al. | 355/52 |
| 6,567,162 B2 * | 5/2003 | Koren et al. | 356/237.2 |
| 6,646,729 B2 * | 11/2003 | van der Laan et al. | 356/124 |
| 6,674,510 B1 * | 1/2004 | Jasper et al. | 355/55 |
| 6,717,683 B1 * | 4/2004 | Wakashiro et al. | 356/614 |
| 6,741,331 B2 * | 5/2004 | Boonman et al. | 355/67 |
| 6,782,596 B2 * | 8/2004 | Miller | 29/407.05 |
| 6,882,405 B2 * | 4/2005 | Jasper et al. | 355/55 |
| 6,897,947 B1 * | 5/2005 | van der Laan et al. | 356/124 |
| 6,924,884 B2 * | 8/2005 | Boonman et al. | 355/55 |
| 6,990,215 B1 * | 1/2006 | Brown et al. | 382/106 |
| 7,019,815 B2 * | 3/2006 | Jasper et al. | 355/55 |
| 7,065,851 B2 * | 6/2006 | Miller | 29/407.05 |
| 7,073,239 B2 * | 7/2006 | Miller | 29/407.05 |
| 7,119,351 B2 * | 10/2006 | Woelki | 250/559.4 |
| 7,180,606 B2 * | 2/2007 | Mahon et al. | 356/607 |
| 7,206,058 B2 * | 4/2007 | Modderman et al. | 355/55 |
| 7,239,399 B2 * | 7/2007 | Duquette et al. | 356/614 |
| RE41,924 E * | 11/2010 | Nemets et al. | 250/559.4 |
| 8,307,528 B2 * | 11/2012 | DeRoche et al. | 29/407.05 |
| 8,313,271 B2 * | 11/2012 | Smith | 409/131 |
| 8,468,672 B2 * | 6/2013 | Wallace | 29/407.06 |
| 2002/0008869 A1 * | 1/2002 | Van der Laan et al. | 356/124 |
| 2002/0036758 A1 * | 3/2002 | de Mol et al. | 355/53 |
| 2002/0108226 A1 | 8/2002 | Miller | |
| 2002/0167651 A1 * | 11/2002 | Boonman et al. | 355/67 |
| 2002/0180960 A1 * | 12/2002 | Koren et al. | 356/237.2 |
| 2004/0048173 A1 * | 3/2004 | Tutt et al. | 430/22 |
| 2004/0061778 A1 * | 4/2004 | Yamane et al. | 348/86 |
| 2004/0080737 A1 * | 4/2004 | Jasper et al. | 355/55 |
| 2004/0130691 A1 * | 7/2004 | Boonman et al. | 355/53 |
| 2004/0144760 A1 * | 7/2004 | Cahill et al. | 219/121.68 |
| 2004/0152233 A1 * | 8/2004 | Nemets et al. | 438/106 |
| 2005/0088638 A1 * | 4/2005 | Jasper et al. | 355/55 |
| 2005/0206879 A1 * | 9/2005 | Van Dijk et al. | 356/121 |
| 2010/0286812 A1 * | 11/2010 | Slettemoen et al. | 700/160 |

OTHER PUBLICATIONS

Internet Search; Cleaning of Fiducial Patterns; Jun. 18, 2014.*

John G. Nee, Fundamentals of Tool Design, 4th Edition, ISBN: 0-87263-490-6, 1998, 769 pp (Publisher: Society of Manufacturing Engineers, Dearborn, MI 48121).

Modern Machine Shop's Handbook for the Metalworking Industries, Woodrow Chapman, Ed., ISBN: 1-56990-345-X, 2002, 2368 pp (Publisher: Hanser Gardner).

Modern Machine Shop's Guide to Machining Operations, Woodrow Chapman, Ed., ISBN: 1-56990-357-3, 2004, 968 pp (Publisher: Hanser Gardner).

"Fundamentals of Tool Design, 5th Edition", Nee, John and David Smith, ISBN: 978-0872636507, 2003, 404 pp (Dearborn, Michigan: Society of Manufacturing Engineers), Chapter 4 pp. 89-146.

* cited by examiner

OPTO-MECHANICAL POSTION FINDER

FIELD OF INVENTION

The present invention relates to the field of technical arrangements and methods for determining positions, and more specifically to an apparatus and a method for determining a positional deviation that has occurred in the course of a mechanical machining operation or a mechanical control activity.

BACKGROUND

In order to simplify this disclosure by uniquely identifying important parts related to a typical machine system, which may be a system for mechanical quality control, we shall in the following explain the use of some general terms. The term "machine" denotes any production or quality control machine, such as machining centers for milling, drilling, turning, etc., an EDM (Electrical Discharge Machine), a CMM (Coordinate Measuring Machine), a touch probe and stylus position sensing machine, a computer vision system, even a simple mechanical support structure, or similar. "Work piece" denotes a part to be machined or to be subjected to quality control. The actual area on the work piece that has been machined, or quality controlled, is denoted "work area". The part or device that is performing the actual machining or quality control of the work area is denoted "work tool". The work tool can be a machining tool (for milling, turning, drilling, etc.), a spark erosion tool (EDM tool), a touch probe or stylus position sensor, an optical imaging sensor, an electromagnetic sensor, or similar. Typically, the work piece is fastened to the machine by use of a "work holder". We shall denote the following 3 distinct parts of the work holder by "work holder support", "work clamp", and "work locator(s)". In some cases, the work holder, or some of its parts, may be identified as an integral part of the machine.

In relation to the definition of present day mechanical reference systems, the work locators play a crucial role. These work locators are defined mechanical positions against which the work piece is placed, and thereby the work piece position is defined relative to the machine and work tool. All the mechanical parts of a machine including the different support structures, work pieces, work tools, and work holders we shall call a machine part.

The position of the work piece, or the different parts of a machine, etc., shall, unless otherwise stated, in this document typically mean the position, orientation, or both of the aforementioned, relative to another part. We shall call the meeting position between the work tool and work piece "the work position".

There are no viable techniques available for reading the work position directly at the time when the machining or quality control actually is taking place. In many cases the positional precision of machines relative to the work locators are taken care of by automatically reading the exact position from e.g. glass rulers, by indicating the position of the corresponding translation stages, by relying on motor position controllers and encoders, or simply by use of fixed mountings. In order to position the work piece, the work holders either simply clamp it against some more or less prepared locator surfaces, or clamp it against well-prepared mechanical locator pins. Then, the work piece position is found by use of a position sensor. In some cases work holders themselves also contain position sensors. However, ultimately what is required is to accurately know the work tool position(s) in relation to the work area position(s). Those positions are not readily available for direct reading since the positions readers are located offset from the work area and work tool positions. This means that quite often residual angular and translation offsets, between the reading and working positions, are not properly taken care of. In addition actual work piece clamping, work tool replacement, moving a work piece from one machine to the other, and mechanical transmission errors, may result in unaccountable offsets between work tool and work area positions. Finally unaccountable displacement errors also occur during machining, or a quality control sensor reading, as can be the case when thermal and mechanical forces are working, or the work tool is changed, changing position, wearing down, or replaced. In general, these errors are tackled by relying on good craftsmanship in making, or using, work holders with properly arranged work locators and holding forces. For reference, see "Fundamentals of tool design"; John G. NEE, ISBN: 0-87263-490-6, 1998, 769 pp (Publisher: Society of Manufacturing Engineers, Dearborn, Mich. 48121). However, regular updating of a machine with correct position values during the work process is an elaborate task that is seldom undertaken, and when an update is performed important reference data may not be sufficiently accurate, or they may be lacking all together. A good example is when a chuck mounted milling cutter is replaced with a chuck mounted stylus sensor in order to change the process from machining to position quality control, and back again. This may introduce an unknown position offset between the machining and position control tool that does not make it possible to correctly deal with offset position errors.

To improve accuracy, or counteract the fact that unaccountable displacements may occur, several techniques are in common use such as: mechanical touch probe and stylus sensing, macroscope and microscope viewing, laser beam obstruction sensing, and pressure transducer sensing, see "Modern Machine Shop's Handbook for the Metalworking Industries"; Editor Woodrow Chapman, ISBN: 1-56990-345-X; 2002, 2368 pages, (Publisher: Hanser Gardner) and "Modern Machine Shops Guide to Machining Operations"; Woodrow Chapman; ISBN: 1-56990-357-3, 2004, 968 pages (Publisher: Hanser Gardner). The touch probe determines the position of the work piece by use of a position sensing stylus tip. This touch probe can be mounted on the work tool carrier, in the work tool chuck, or possibly on the work piece carrier. In order to work properly it must either be calibrated each time it is used, permanently fastened, or reproducibly mounted in a mechanical fixture or chuck. During machining the touch probe must be removed, otherwise it may collide with the work holder or work piece. In order to accurately find 2D or 3D positions, or angular displacements, several somewhat time consuming readings in different directions have to be carried out. Alternatively, through a combination of microscope viewing and position control of the microscope, key relative work piece and work area positions can also be found, or calibrated. But, since human viewing is involved, this technique lacks the potential of becoming fully automated, and also has difficulty in finding work holder locator positions. Yet other techniques help determine the position of the work tool tip by reading the degree of obstruction of a laser beam, or reading the work tool tip pressure by use of a pressure transducer. During wear this position can be updated. But these techniques do not tell where the work piece is placed.

Like microscope viewing, techniques related to manual, semi-automated, or automated camera viewing should be useful in finding relative or calibrated positions on the work piece and work area. U.S. Pat. No. 6,782,596 B2 discloses yet another approach where a plurality of datum are disposed and calibrated relative to a work piece before the work piece is disposed in a machine. However, according to the knowledge of the present inventors, common to all presently known techniques is that they lack the ability to do regular position sensing while machining or quality control is taking place, and/or that they depend on calibration and position sensing external to the machine itself. They also lack a holistic approach that properly copes with the position errors of other parts than those actually machined or controlled. During the work processes they are relatively time consuming in their operation, and may in some cases themselves introduce unaccountable positional errors.

SUMMARY

The present invention provides an apparatus for finding part position relations of parts of mechanical and opto-mechanical machining and quality control systems, and for recognizing these parts, comprising the features recited in the accompanying independent patent claim 1.

Further advantageous features of the apparatus for finding part position relations of parts of mechanical and opto-mechanical machining and quality control systems are recited in the accompanying dependent patent claims 2 through 39.

The present invention provides a method for finding part position relations of parts of mechanical and opto-mechanical machining and quality control systems, and for recognizing these parts, comprising the features recited in the accompanying independent patent claim 79.

Further advantageous features of the apparatus and the method for finding part position relations of parts of mechanical and opto-mechanical machining and quality control systems are recited in the accompanying dependent patent claims 41 through 78.

The present invention provides a computer program product comprising a computer readable medium having thereon computer readable and computer executable code arranged to adapt a computer means to perform the method, the features of which computer program product are recited in the accompanying patent claim 79.

The present invention relies on optical contactless sensing technology and holds the promise of becoming an in-the-process quality control technique that regularly and automatically can provide updates of position information for key machine parts without having to rely on external quality control and calibration means. The recording of optical fiducial patterns makes it possible to read positions close to the work positions without physical contact, and part position finder strategies complete the job by enabling calculation of positions of other related parts, including the actual work positions themselves.

The present invention determines part positions of machines by associating or mechanically integrating fiducial patterns with key parts, and optically detecting the images of these patterns. FIGS. 2 and 4 schematically exemplifies machines covered by the present invention where 1A-F exemplifies fiducial patterns integrated with parts within these machines. These fiducial patterns 1 can be geometrical part details, patterned tags fastened to the parts, or part surface microstructure. The present invention finds part positions and displacements according to given part position finder 6 strategies, even the positions of those parts that do not contain fiducial patterns. As illustrated by FIG. 1 this is accomplished by associating fiducial pattern images 14 and machine position data 17 to parts that are members of a part geometry relation 15, and under part displacement constraints 16, finding given part positions or displacements 18. FIG. 3 exemplifies a part geometry relation 15 as a hierarchy of coordinate frames where 1A-F represents fiducial pattern local positions and 2A-D represent locator local positions. The present invention also identifies and recognizes fiducial patterns, and thereby identifies and recognizes work pieces, work holders, work tools, gauge tools, and machine parts in general.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally the present invention, by way of example, and by various embodiments discussed in the present disclosure.

DETAILED DESCRIPTION OF THE PREFERRED EMBODIMENTS

In the following detailed description, reference is made to the accompanying drawings which form a part hereof, and which is shown by way of illustration specification embodiments in which the invention may be practiced. These embodiments are described in sufficient detail to enable those skilled in the art to practice the invention, and it is to be understood that the embodiments may be combined, or that to other embodiments structural, logical and electrical changes may be made while still representing the present invention. The following detailed description is, therefore, not to be taken in a limiting sense, as the general scope of the present invention is defined by the appended claims and their equivalents.

In the following examples, a reference coordinate frame position, or simply a frame, represents the position, included orientation, of a component, or a part of a larger structure, relative to another component, or part of a larger structure. The specification of a frame position may both represent nominal and measured positions. We shall also describe what we call frame relations. These relations represent the frame positions and the fact that components or parts are mechanically or optically interlinked, or that parts of a larger structure are mechanically interlinked. In one of its simplest forms, the frame relations may only describe four frames that for example represent a machine support structure, a moving part inside a machine, a part fastened to the moving part, and an optical detector fastened to the moving part, respectively. Then the position of the part fastened to the moving part may be determined from data provided by the optical detector. In other cases, the reference frame relations may represent a more complicated mechanical structure.

In the following, the present invention will be described by way of several examples.

Example 1

Figure 1:
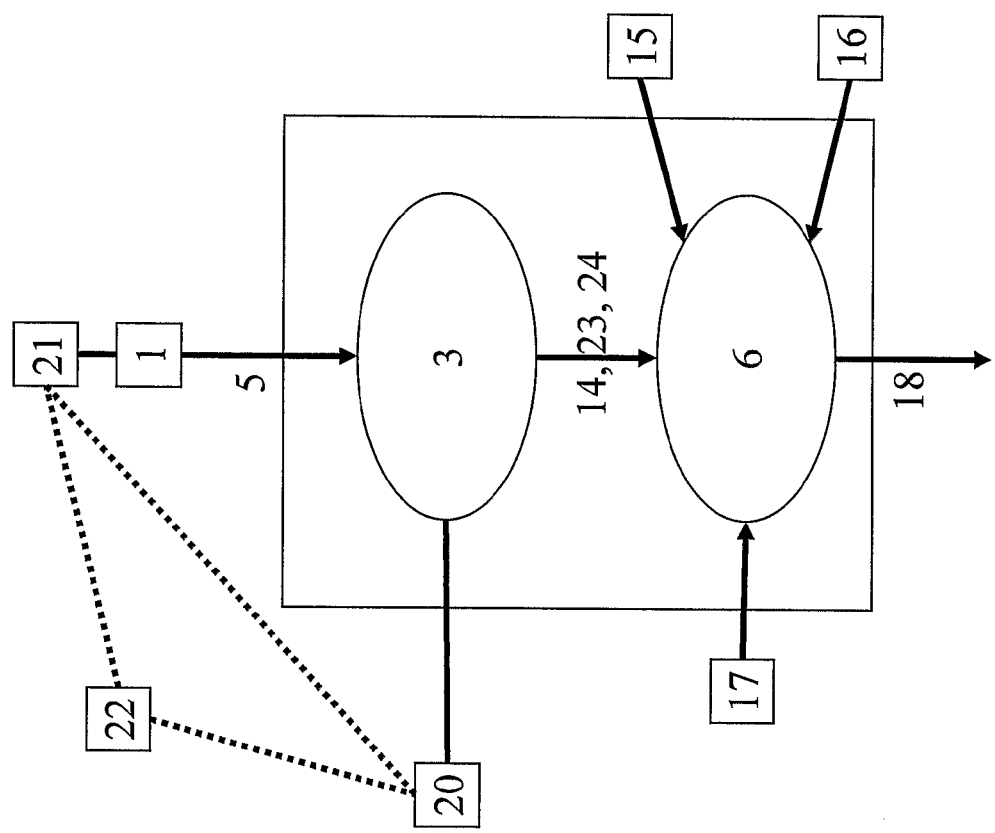
FIG. 1 shows a functional diagram that illustrates key ideas of the present invention. In this figure the arrowhead lines indicate data transfer. The fully drawn and dotted lines indicate mechanical interlinks. The dotted lines indicate alternative mechanical interlinks. Images of fiducial patterns 1 are detected by means of the optical detector 3 and converted to fiducial pattern images 14. On the basis of knowledge about part geometry relations 15 the part position finder 6 associates fiducial pattern images 14 and corresponding machine position data 17 to given parts. By use of part displacement constraints 16, that defines what part(s) position displacements that are allowed, the part position finder 6 finds what part(s) displacements 18 or positions that results in the recorded fiducial pattern image 14 displacements or positions.
Figure 2:
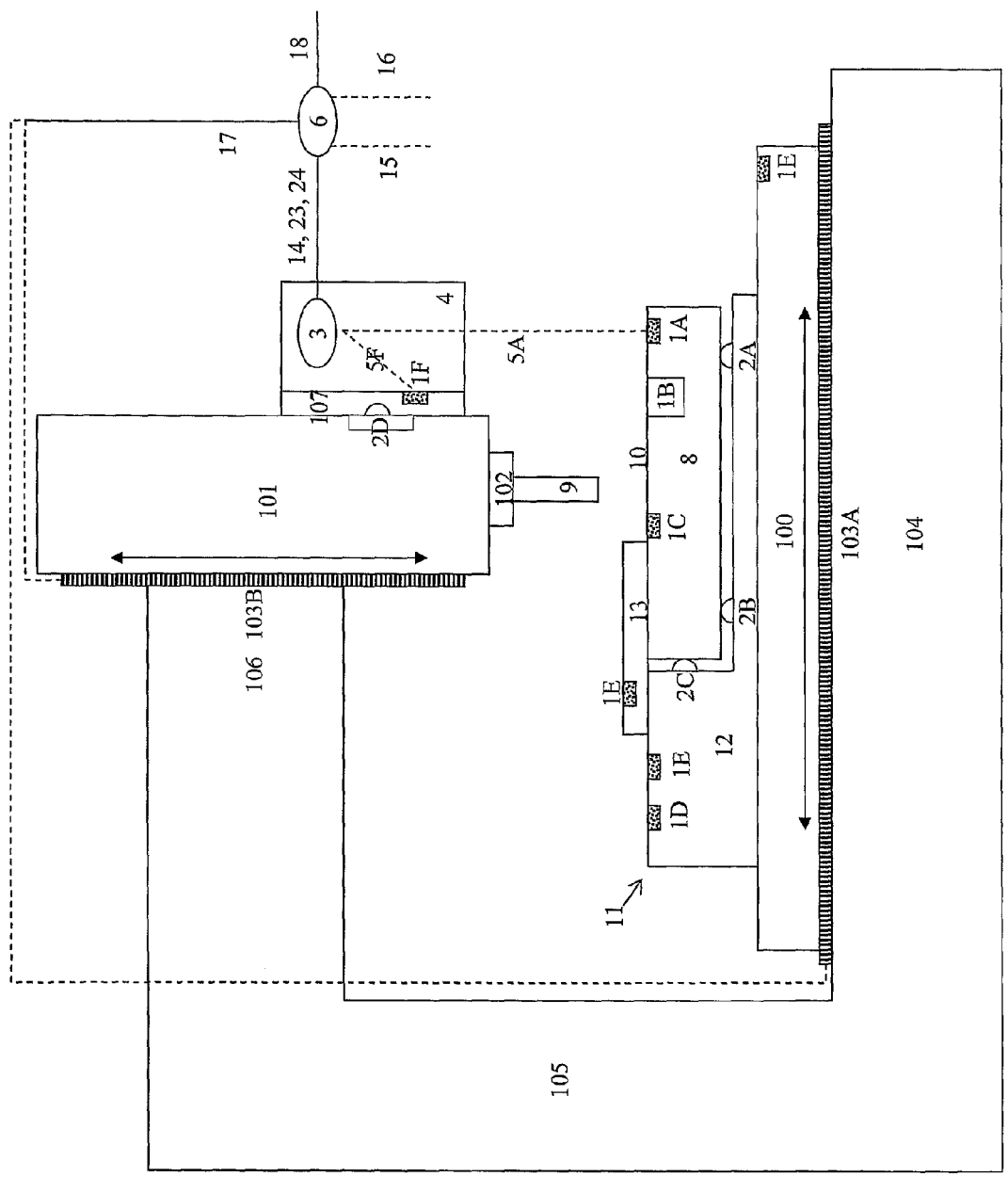
FIG. 2 is a schematic drawing illustrating generally one example of a machine, representing any machine such as a milling machine, drilling machine, Die sinking EDM (Electrical Discharge Machine), Wire EDM, or similar, the drawing illustrating also generally one example of a machine, representing any quality control machine where the work tool 9 may be for example either a touch probe as in a CMM (Coordinate Measuring Machine), or an optical vision sensor, or similar, FIG. 3 is a schematic diagram where selected parts of the machine illustrated in FIG. 2 are represented by coordinate reference frames, and where the lines represent mechanical (solid) and optical (dotted) interlinks. In this figure the rectangular boxes represent coordinate reference frames. The solid lines between the boxes represent mechanical interlinks and the dotted lines optical interlinks/paths. The small circles represent either fiducial patterns 1A-F or mechanical locators 2A-C. The inclusion of an optical detector 3 and fiducial patterns 1 helps create what we shall call closed loops of reference frames making it possible to find the position of parts that are related to certain loops.

FIG. 2 is a schematic drawing illustrating, by way of example, a machine that may represent any machine such as a milling machine, drilling machine, Die sinking EDM (Electrical Discharge Machine), Wire EDM, or similar. This schematic drawing also illustrates generally, by way of example, one example of a machine that represents any quality control machine where the work tool 9 may be for example either a touch probe as in a CMM (Coordinate Measuring Machine), or an optical vision sensor, or similar. These machines can be equipped with a range of different mechanical configurations, but all can be equipped with an apparatus according to the present invention. Some key elements of these machines are indicated as a work piece carrier 100 (typically performing 2 orthogonal translations x and y), a work tool carrier 101 (typically performing one translation in the z direction, but sometimes also one or several additional rotations), a work tool chuck 102, position encoders 103A, 103B, and a support structure. The support structure is in this example indicated to include a work piece support 104, a machine support link 105, and a work tool support 106. The purpose of this machine is to perform machining or quality control of the work piece 8 by means of the work tool 9. In this example the work tool 9 is fastened to the work tool chuck 102. The work tool 9 can be a machining tool, spark erosion tool, mechanical sensor, position stylus sensor, optical imaging sensor, microscope, or similar. An area of the work piece 8, to be machined or quality controlled, we shall call the work area 10. Moving the work tool 9 relative to the work piece 8, by means of the work tool carrier 101 and the work piece carrier 100, performs displacements necessary for the machining or quality control processes to take place. During process the position of these carriers is read at the locations of the position encoders 103A, 103B. In order to position the work piece 8, and thereby the work area 10, relative to the work tool 9, the work piece 8 is placed in a work holder 11. Typically, the work holder 11 is firmly fastened to the work piece carrier 100. A work holder 11 may typically consist of a work holder support 12, a work holder clamp 13, and work locators 2A, 2B, 2C. By placing the work piece 8 against the work locators 2A, 2B, 2C, and by clamping it by use of the work holder clamp 13, the work piece 8 is securely fastened to the work holder 11.

In this example, a problem to be dealt with can be stated as follows. In relation to what has been described above, however, one key problem is that the position encoders 103A and 103B are mounted at a distance away from the locations of the work area 10 and the work tool 9 tip, and for example, due to unknown angular errors, may not be reading the correct positions of the work tool 9 or the work piece area 10. As a consequence, the clamping process and both thermal and mechanical forces may cause the location of the work piece 8, relative to the location of the work tool 9 position, to slightly change or vary during operations of the machining or quality control. In the present example we shall assume that the work piece 8 might translate horizontally in the x- and y-direction relative to the work holder support 12.

Accordingly, details regarding the first machine part 20; the second machine part 21; the fiducial pattern 1; the optical detector 3; the fiducial pattern image 14 and machine position 17 should be provided. The reduction of the position errors is accomplished by recording optical images of fiducial patterns, as exemplified in FIG. 2 where an optical detector 3 records the fiducial pattern image 14 of the fiducial pattern 1A and relays it to the a part position finder 6. The optical detector is a 2 dimensional array camera. The optical detector 3 is by means of the optical assembly 4 and the bracket 107 fastened to the work tool carrier 101. The part position finder 6 can be embodied as process within a computer, personal computer, dedicated processor, or similar. The fiducial pattern images 14 are by known means converted/digitized and will be available for computer position calculation. In FIG. 2 the fiducial pattern 1A is, as an example, the given surface structure of the work piece 8, or alternatively a patterned label applied to the surface. Through the optical path 5A the fiducial pattern 1A is optically imaged to the optical detector 3. The same fiducial pattern 1A is also via the work piece 8 and the locators 2A, 2B, 2C mechanically interlinked to other parts of the machine. In order to improve machine performance two fiducial pattern images 14 of the fiducial pattern 1A is recorded. A first fiducial pattern image 23 is recorded to represent a reference state. After the machine has been in use for a while a second fiducial pattern image 24 is recorded. Alternatively the work piece 8 is taken out for machining elsewhere and put back in place before a second fiducial pattern image 24 is recorded. The part position finder 6 records, simultaneously with the respective recordings of the fiducial pattern images 23 and 24, the corresponding machine position data 17. The machine position data 17 are the positions of the machine position encoders 103A and 103B. The purpose of the part position finder 6 is to deduce what the position, or position displacement, of important machine parts are. For this purpose the part position finder 6 takes part geometry relations 15 and part displacement constraints 16 into account.

Figure 3:
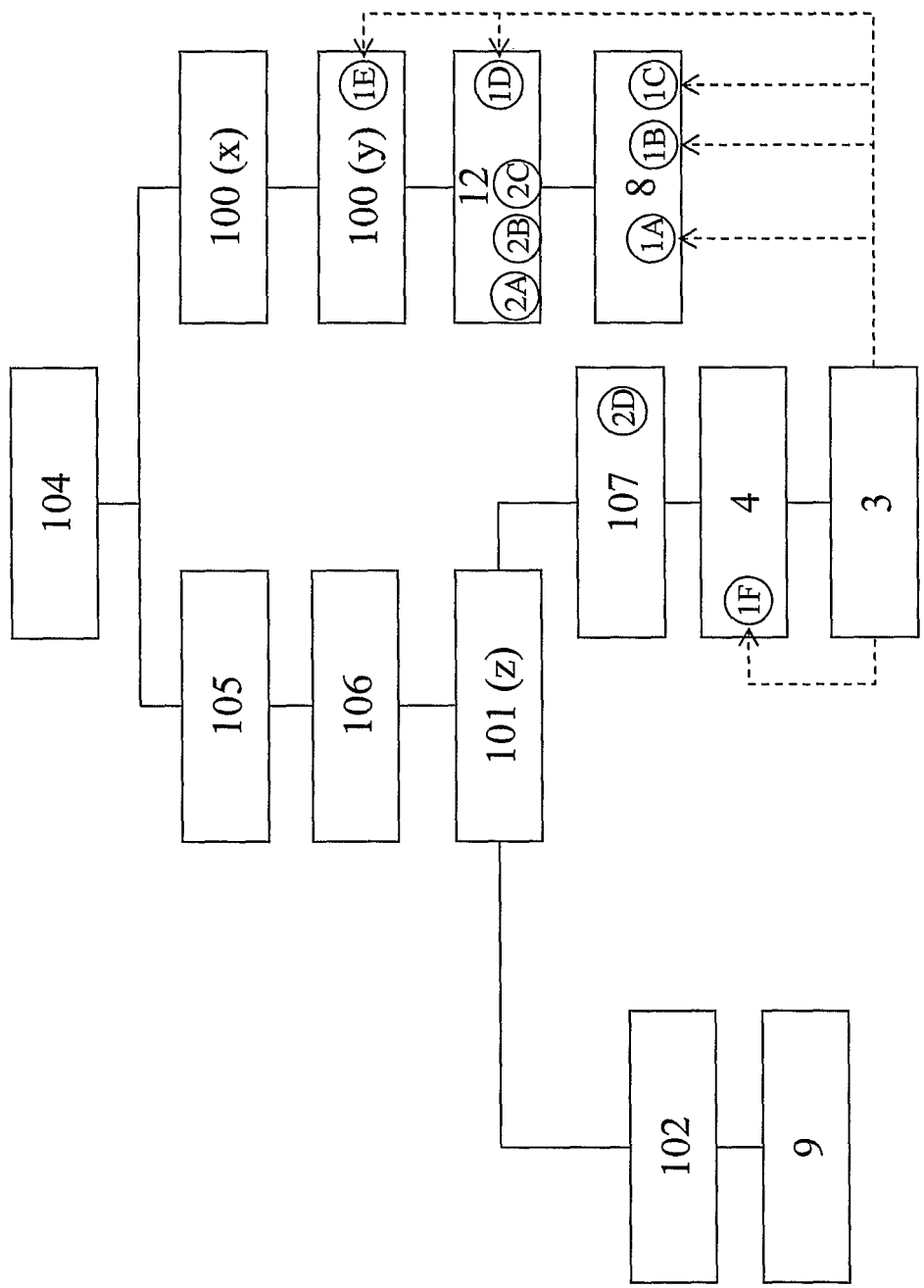

Accordingly, details regarding part geometry relations 15 and part displacement constrains 16 should be provided. The part geometry relations 15 are entered into the part position finder 6 by the means of a keyboard. The diagram in FIG. 3 shows the part geometry relations 15 represented as the mechanical (fully drawn lines) and optical (dashed lines) interlinks between coordinate frames (rectangular boxes). This diagram in FIG. 3 is one representation of the physical arrangement of FIG. 2 where a moderate selected number of parts are taking into account. A coordinate frame represents the position, included orientation, of a part relative to another part. The part displacement constraints 16 are also entered into the position finder 6 by the means of the keyboard. The part displacement constraints 16 define what part displacement degrees of freedom that are allowed in finding new part positions, included their maximum amount/magnitude. By taking the part displacement constraints 16 into account the part position finder 6 finds the position displacement of parts with a minimum of position recording effort. In the present example we assume that the relative position between the work holder 12 and the work piece 8 is, for one reason or the other, changing. We assume in the present example that the x-y-position (in the horizontal plane) of first and second fiducial pattern images 23 and 24 of the fiducial pattern 1A is recorded. Then according to our presumption a simple part displacement constraints 16 is that the work piece 8 is the only part that is allowed to move, and that the only displacements degrees of freedom that are allowed are the x- and y-translations of the work piece 8. With this information the part position finder 6 can find the new work piece 8 position on the basis of only one second recording of the fiducial pattern 1A.

Now, part position finder initial condition; combining 14, 15, 16, 17 and ensuring loop consistency are elucidated. As a starting point for calculating a part displacement 18, i.e. the new work piece 8 position relative to the work holder support 12, the part position finder 6 ensures that all relevant initial conditions of the part geometry relations are consistent with each others. This is accomplished by recording the first fiducial pattern image 23 of the fiducial pattern 1A, and corresponding machine position data 17, into the proper reference frames of the part geometry relations 15. I.e. the position encoder 103A data are added to the position of the work piece reference frame 100 (FIG. 3), representing the work piece carrier 100 position relative to the work piece support 104. Likewise the position encoder 103B data are added to the position of the frame 101 (FIG. 3), representing the work tool carrier 101 position relative to the work tool support 106. Finally the fiducial pattern image 23 of the fiducial pattern 1A is added to the optical detector 3 frame (see FIG. 3). This ensures that the initial part geometry relations 15 are consistent with each others, i.e. for example all coordinate frames reproduce correctly any spatial position within the geometry, and especially that the calculation of a position through any closed loop of a part geometry relations 15 replicates itself. As the machine is changing its condition the second fiducial pattern image 24 of the fiducial pattern 1A, and the corresponding new machine position data 17, are fed into the part geometry relations 15 of the part position finder 6 in the same manner as described above.

Now, fiducial pattern image displacement is elucidated. The part position finder 6 calculates the x-y-displacement between the first fiducial pattern image 23 and the second fiducial pattern image 24 of the fiducial pattern 1A. In this example we assume that the displacement calculation is carried out by the means of mathematical correlation. I.e. the part position finder 6 repeatedly stepwise translates in the x- and y-directions one image compared to the other, calculates the correlation, and finds the translation where the correlation is at its maximum. The correlation is calculated as the product of the gray level numbers for corresponding image pixel positions, then calculating the sum of the products over the image overlap.

In the following, how to find part displacement 18; loop calculation is described. The fiducial pattern 1A is via the work piece 8 mechanically interlinked to the optical detector 3 via the work holder 12, work piece carrier 100, work piece support 104, machine support link 105, work tool support 106, work tool carrier 101, bracket 107, and optical assembly 4. The fiducial pattern 1A is via the optical path 5A also optically interlinked to the optical detector 3. This creates what we call a loop(3-8-12-100-104-105-106-101-107-4-3). The part position finder 6 finds the work piece 8 x-y-translations by ensuring that all the frame positions in this loop are consistent with each other. By starting with a given position, and calculating the positions mapped through a certain closed loop in the diagram of FIG. 3, we know that we should come back to the same position. I.e. one key purpose of the part position finder 6 of this invention is to ensure that, when positions are mapped through the whole loop, all positions that are members of a given closed loop should map back on to themselves. If the work piece 8 has translated in between the recording of the first fiducial pattern image 23 and the second fiducial pattern image 24 then the frame positions of the loop(3-8-12-100-104-105-106-101-107-4-3) are no longer consistent with each other. The part position finder 6 then applies the part displacement constraint 16 that only the frame representing the work piece 8 is allowed to translate in the horizontal plane (i.e. the x- and y-directions). Except for the carrier 103A and 103B displacements, taken care of by the machine position data 17, all other frames are assumed to have not moved.

Accordingly, a mathematical solution to the loop calculation is developed. The mathematical problem of restoring consistency is obtained by solving a set of linear equations, describing the transforms between the different frames. This can be accomplished by use of 4×4 matrices describing the 3 dimensional translation and rotation by means of so called homogenous coordinates. In the present example the x-y translations between the fiducial pattern images 23 and 24 are know values and the x-y-translation of the work piece 8, the part displacement 18, the unknown values. By this means the part position finder 6 calculates the work piece 8 translation and thereby also the work piece 8 new position.

Example 2

FIG. 2 is a schematic drawing illustrating, by way of example, a machine that may represent any machine such as a milling machine, drilling machine, Die sinking EDM (Electrical Discharge Machine), Wire EDM, or similar. This schematic drawing also illustrates generally, by way of example, one example of a machine that represents any quality control machine where the work tool 9 may be for example either a touch probe as in a CMM (Coordinate Measuring Machine), or an optical vision sensor, or similar. These machines can be equipped with a range of different mechanical configurations, but all can be equipped with an apparatus according to the present invention. Some key elements of these machines are indicated as a work piece carrier 100 (typically performing 2 orthogonal translations x and y), a work tool carrier 101 (typically performing one translation in the z direction, but sometimes also one or several additional rotations), a work tool chuck 102, position encoders 103A, 103B, and a support structure. The support structure is in this example indicated to include a work piece support 104, a machine support link 105, and a work tool support 106. The purpose of this machine is to perform machining or quality control of the work piece 8 by means of the work tool 9. In this example the work tool 9 is fastened to the work tool chuck 102. The work tool 9 can be a machining tool, spark erosion tool, mechanical sensor, position stylus sensor, optical imaging sensor, microscope, or similar. An area of the work piece 8, to be machined or quality controlled, we shall call the work area 10. Moving the work tool 9 relative to the work piece 8, by means of the work tool carrier 101 and the work piece carrier 100, performs displacements necessary for the machining or quality control processes to take place. During process the position of these carriers is read at the locations of the position encoders 103A, 103B. In order to position the work piece 8, and thereby the work area 10, relative to the work tool 9, the work piece 8 is placed in a work holder 11. Typically, the work holder 11 is firmly fastened to the work piece carrier 100. A work holder 11 may typically consist of a work holder support 12, a work holder clamp 13, and work locators 2A, 2B, 2C. By placing the work piece 8 against the work locators 2A, 2B, 2C, and by clamping it by use of the work holder clamp 13, the work piece 8 is securely fastened to the work holder 11.

In this example, a problem to be dealt with can be stated as follows. In relation to what has been described above, however, one key problem is that the position encoders 103A and 103B are mounted at a distance away from the locations of the work area 10 and the work tool 9 tip, and for example, due to unknown angular errors, may not be reading the correct positions of the work tool 9 or the work piece area 10. As a consequence, the clamping process and both thermal and mechanical forces may cause the location of the work piece 8, relative to the location of the work tool 9 position, to slightly change or vary during operations of the machining or quality control. In the present example we shall assume that the work piece 8 might translate relative to the work holder support 12.

Accordingly, details regarding the first machine part 20; the second machine part 21; the fiducial pattern 1; the optical detector 3; the fiducial pattern image 14 and machine position 17 should be provided. The reduction of the position errors is accomplished by recording optical images of fiducial patterns, as exemplified in FIG. 2 where an optical detector 3 records the fiducial pattern image 14 of the fiducial pattern 1B and relays it to the a part position finder 6. The optical detector is a 2 dimensional array camera. The optical detector 3 is by means of the optical assembly 4 and the bracket 107 fastened to the work tool carrier 101. The part position finder 6 can be embodied as process within a computer, personal computer, dedicated processor, or similar. The fiducial pattern images 14 are by known means converted/digitized and will be available for computer position calculation. In FIG. 2 the fiducial pattern 1B is, as an example, a machined detail in the surface of the work piece 8 such as a drilled hole or milled detail. Through the optical path 5B (not shown in FIG. 2) the fiducial pattern 1B is optically imaged to the optical detector 3. The same fiducial pattern 1B is also via the work piece 8 and the locators 2A, 2B, 2C mechanically interlinked to other parts of the machine. In order to improve machine performance two fiducial pattern images 14 of the fiducial pattern 1B is recorded. A first fiducial pattern image 23 is recorded to represent a reference state. After the machine has been in use for a while a second fiducial pattern image 24 is recorded. Alternatively the work piece 8 is taken out for machining elsewhere and put back in place before a second fiducial pattern image 24 is recorded. The part position finder 6 records, simultaneously with the respective recordings of the fiducial pattern images 23 and 24, the corresponding machine position data 17. The machine position data 17 are the positions of the machine position encoders 103A and 103B. The purpose of the part position finder 6 is to deduce what the position, or position displacement, of important machine parts are. For this purpose the part position finder 6 takes part geometry relations 15 and part displacement constraints 16 into account.

Accordingly, details regarding part geometry relations 15 and part displacement constrains 16 should be provided. The part geometry relations 15 are entered into the part position finder 6 by the means of a keyboard. The diagram in FIG. 3 shows the part geometry relations 15 represented as the mechanical (fully drawn lines) and optical (dashed lines) interlinks between coordinate frames (rectangular boxes). This diagram in FIG. 3 is one representation of the physical arrangement of FIG. 2 where a moderate selected number of parts are taking into account. A coordinate frame represents the position, included orientation, of a part relative to another part. The part displacement constraints 16 are also entered into the position finder 6 by the means of the keyboard. The part displacement constraints 16 define what part displacement degrees of freedom that are allowed in finding new part positions, included their maximum amount/magnitude. By taking the part displacement constraints 16 into account the part position finder 6 finds the position displacement of parts with a minimum of position recording effort. In the present example we assume that the relative position between the work holder 12 and the work piece 8 is, for one reason or the other, changing. We assume in the present example that the x-y-position (in the horizontal plane) of first and second fiducial pattern images 23 and 24 of the fiducial pattern 1B is recorded. Then according to our presumption a simple part displacement constraint 16 is that the work piece 8 is the only part that is allowed to move, and that the only displacements degrees of freedom that are allowed are the x- and y-translations of the work piece 8. With this information the part position finder 6 can find the new work piece 8 position on the basis of only one second recording of the fiducial pattern 1B.

Now, part position finder initial condition; combining 14, 15, 16, 17 and ensuring loop consistency are elucidated. As a starting point for calculating a part displacement 18, i.e. the new work piece 8 position relative to the work holder support 12, the part position finder 6 ensures that all relevant initial conditions of the part geometry relations are consistent with each others. This is accomplished by recording the first fiducial pattern image 23 of the fiducial pattern 1B, and corresponding machine position data 17, into the proper reference frames of the part geometry relations 15. I.e. the position encoder 103A data are added to the position of the work piece reference frame 100 (FIG. 3), representing the work piece carrier 100 position relative to the work piece support 104. Likewise the position encoder 103B data are added to the position of the frame 101 (FIG. 3), representing the work tool carrier 101 position relative to the work tool support 106. Finally the fiducial pattern image 23 of the fiducial pattern 1B is added to the optical detector 3 frame (see FIG. 3). This ensures that the initial part geometry relations 15 are consistent with each others, i.e. for example all coordinate frames reproduce correctly any spatial position within the geometry, and especially that the calculation of a position through any closed loop of a part geometry relations 15 replicates itself. As the machine is changing its condition a second fiducial pattern image 24 of the fiducial pattern 1B, and the corresponding new machine position data 17, are fed into the part geometry relations 15 of the part position finder 6, in the same manner as described above.

Now, fiducial pattern image displacement is elucidated. The part position finder 6 calculates the x-y-translations between the first fiducial pattern image 23 and the second fiducial pattern image 24 of the fiducial pattern 1B. In this example we assume that the fiducial pattern 1B is a hole and that the translation calculation is carried out by calculating the hole center of the two images, and then calculating the center translation. To find the hole center known image processing techniques of finding hole edge gray level thresholds and calculating the center of these threshold positions is used.

In the following, how to find part displacement 18; loop calculation is described. The fiducial pattern 1B is via the work piece 8 mechanically interlinked to the optical detector 3 via the work holder 12, work piece carrier 100, work piece support 104, machine support link 105, work tool support 106, work tool carrier 101, bracket 107, and optical assembly 4. The fiducial pattern 1B is via the optical path 5B also optically interlinked to the optical detector 3. This creates what we call a the loop(3-8-12-100-104-105-106-101-107-4-3). The part position finder 6 finds the work piece 8 displacements by ensuring that all the frame positions in this loop are consistent with each other. By starting with a given position, and calculating the positions mapped through a certain closed loop in the diagram of FIG. 3, we know that we should come back to the same position. I.e. one key purpose of the part position finder 6 of this invention is to ensure that, when positions are mapped through the whole loop, all positions that are members of a given closed loop should map back on to themselves. If the work piece 8 has translated in between the recording of the first fiducial pattern image 23 and the second fiducial pattern image 24 then the frame positions of the loop(3-8-12-100-104-105-106-101-107-4-3) are no longer consistent with each other. The part position finder 6 then applies the part displacement constraint 16 that only the frame representing the work piece 8 is allowed to translate in the horizontal plane (i.e. the x- and y-directions). Except for the carrier 103A and 103B displacements, taken care of by the machine position data 17, all other frames are assumed to have not moved.

Accordingly, a mathematical solution to the loop calculation is developed. The mathematical problem of ensuring consistency is obtained by solving a set of linear equations, describing the transforms between the different frames. This can be accomplished by use of 4×4 matrices describing the 3 dimensional translation and rotation by means of homogenous coordinates. In the present example the x-y translations between the fiducial pattern images 23 and 24 are know values and the x-y-translations of the work piece 8, the part displacement 18, the unknown values. By this means the part position finder 6 calculates the work piece 8 translation and thereby also the work piece 8 new position.

Example 3

FIG. 2 is a schematic drawing illustrating, by way of example, a machine that may represent any machine such as a milling machine, drilling machine, Die sinking EDM (Electrical Discharge Machine), Wire EDM, or similar. This schematic drawing also illustrates generally, by way of example, one example of a machine that represents any quality control machine where the work tool 9 may be for example either a touch probe as in a CMM (Coordinate Measuring Machine), or an optical vision sensor, or similar. These machines can be equipped with a range of different mechanical configurations, but all can be equipped with an apparatus according to the present invention. Some key elements of these machines are indicated as a work piece carrier 100 (typically performing 2 orthogonal translations x and y), a work tool carrier 101 (typically performing one translation in the z direction, but sometimes also one or several additional rotations), a work tool chuck 102, position encoders 103A, 103B, and a support structure. The support structure is in this example indicated to include a work piece support 104, a machine support link 105, and a work tool support 106. The purpose of this machine is to perform machining or quality control of the work piece 8 by means of the work tool 9. In this example the work tool 9 is fastened to the work tool chuck 102. The work tool 9 can be a machining tool, spark erosion tool, mechanical sensor, position stylus sensor, optical imaging sensor, microscope, or similar. An area of the work piece 8, to be machined or quality controlled, we shall call the work area 10. Moving the work tool 9 relative to the work piece 8, by means of the work tool carrier 101 and the work piece carrier 100, performs displacements necessary for the machining or quality control processes to take place. During process the position of these carriers is read at the locations of the position encoders 103A, 103B. In order to position the work piece 8, and thereby the work area 10, relative to the work tool 9, the work piece 8 is placed in a work holder 11. Typically, the work holder 11 is firmly fastened to the work piece carrier 100. A work holder 11 may typically consist of a work holder support 12, a work holder clamp 13, and work locators 2A, 2B, 2C. By placing the work piece 8 against the work locators 2A, 2B, 2C, and by clamping it by use of the work holder clamp 13, the work piece 8 is securely fastened to the work holder 11.

In this example, a problem to be dealt with can be stated as follows. When the position of different machine parts changes by unknown amounts the innovation according to the present disclosure may help. However, in some high accuracy applications even the position of the optical detector 3 may change due to for example thermal drift. Then a fiducial pattern 1F mounted close to the optical detector 3, but in a firm and stable position relative to the work tool carrier 101 may help compensate for this error. In the present example we shall assume that the position of the optical detector 3 translates in the horizontal x- and y-direction.

Accordingly, details regarding the first machine part 20; the second machine part 21; the fiducial pattern 1; the optical detector 3; the fiducial pattern image 14 and machine position 17 should be provided. The reduction of the position errors is accomplished by recording optical images of fiducial patterns, as exemplified in FIG. 2 where an optical detector 3 records the fiducial pattern image 14 of the fiducial pattern 1F and relays it to the a part position finder 6. The optical detector is a 2 dimensional array camera. The optical detector 3 is by means of the optical assembly 4 and the bracket 107 fastened to the work tool carrier 101. The part position finder 6 can be embodied as process within a computer, personal computer, dedicated processor, or similar. The fiducial pattern images 14 are by known means converted/digitized and will be available for computer position calculation. In FIG. 2 the fiducial pattern 1F is, as an example, a glass plate with a predetermined high contrast pattern evaporated on to its surface We assume that the fiducial pattern 1F is trans-illuminated. Through the optical path 5F the fiducial pattern 1F is optically imaged to the optical detector 3. The same fiducial pattern 1F is also via the optical assembly 4 and bracket 107 mechanically interlinked to the work tool carrier 101. In order to compensate for the optical detector 3 displacement only one fiducial pattern image 14 of the fiducial pattern 1F needs to be recorded. Each time a first fiducial pattern image 23 has been recorded the part position finder 6 compares the position of this image with a fiducial pattern image model 25 (not shown in FIG. 2). The purpose of the part position finder 6 is to deduce what the position translation of the optical detector 3 is. For this purpose the part position finder 6 takes part geometry relations 15 and part displacement constraints 16 into account.

Accordingly, details regarding part geometry relations 15 and part displacement constrains 16 should be provided. The part geometry relations 15 are entered into the part position finder 6 by the means of a keyboard. The diagram in FIG. 3 shows the part geometry relations 15 represented as the mechanical (fully drawn lines) and optical (dashed lines) interlinks between coordinate frames (rectangular boxes). This diagram in FIG. 3 is one representation of the physical arrangement of FIG. 2 where a moderate selected number of parts are taken into account. A coordinate frame represents the position, included orientation, of a part relative to another part. The part displacement constraints 16 are also entered into the position finder 6 by the means of the keyboard. The part displacement constraints 16 define what part displacement degrees of freedom that are allowed in finding new part positions, included their maximum amount/magnitude. By taking the part displacement constraints 16 into account the part position finder 6 finds the position displacement of parts with a minimum of position recording effort. In the present example we assume that the relative position between the optical detector 3 and the optical assembly 4, for one reason or the other, changing. We assume in the present example that the x-y-position (in the horizontal plane) of the first fiducial pattern image 23 of the fiducial pattern 1F is recorded. Then according to our presumption a simple part displacement constraints 16 is that the optical detector 3 is the only part that is allowed to move, and that the only displacements degrees of freedom that are allowed are the x- and y-translations of the optical detector 3. With this information the part position finder 6 can find the optical detector 3 position on the basis of the first fiducial pattern image 23 position relative to the fiducial pattern model 25.

Now, part position finder initial condition; combining 14, 15, 16, 17 and ensuring loop consistency are elucidated. As a starting point for calculating a part displacement 18, i.e. the new optical detector 3 position relative to the optical assembly 4, the part position finder 6 ensures that all relevant initial conditions of the part geometry relations are consistent with each others. This is accomplished by placing the fiducial pattern model 25 of the fiducial pattern 1F into a reference position within the optical detector 3 frame (see FIG. 3). This ensures that the initial part geometry relations 15 are consistent with each others with reference to this initial fiducial pattern model 25 reference position, i.e. for example all coordinate frames reproduce correctly any spatial position within the geometry, and especially that the calculation of a position through any closed loop of a part geometry relations 15 replicates itself. As the machine is changing its condition the first fiducial pattern image 23 of the fiducial pattern 1F is fed into the part geometry relations 15 of the part position finder 6, i.e. into the optical detector frame 3.

Now, fiducial pattern image displacement is elucidated. The part position finder 6 calculates the x-y-translation between the fiducial pattern model 25 and the first fiducial pattern image 23 of the fiducial pattern 1F. In this example we assume that the fiducial pattern 1F is a deterministic pattern with many position details, like a matrix of hole patterns, and that the displacement calculation is carried out by calculating the respective centroids of the fiducial pattern image model 25 and the fiducial pattern image 23, and then calculating the centroid displacement. To find a pattern centroid known image processing techniques of finding hole edge gray level threshold positions of each matrix hole, then calculating the center of these threshold positions, and finally finding the centroid of these hole centers.

In the following, how to find part displacement 18; loop calculation is described. The fiducial pattern 1F is via the optical assembly 4 mechanically interlinked to the optical detector 3. The fiducial pattern 1F is via the optical path 5F also optically interlinked to the optical detector 3. This creates what we call the loop(3-4-3). The part position finder 6 finds the optical detector 3 displacements by ensuring that the frame positions in this loop are consistent with each other. By starting with a given position, and calculating the positions mapped through a certain closed loop in the diagram of FIG. 3, we know that we should come back to the same position. I.e. one key purpose of the part position finder 6 of this invention is to ensure that, when positions are mapped through the whole loop, all positions that are members of a given closed loop should map back on to themselves. If the optical detector has moved the first fiducial pattern image 23 of the loop(3-4-3) is no longer consistent with fiducial pattern model 25 position. The part position finder 6 then applies the part displacement constraint 16 that only the frame representing the optical detector 3 is allowed to translate in the horizontal plane (i.e. the x- and y-directions).

Accordingly, a mathematical solution to the loop calculation is developed. The mathematical problem of ensuring consistency is obtained by solving a set of linear equations, describing the transforms between the different frames. This can be accomplished by use of 4×4 matrices describing the 3 dimensional translation and rotation by means of homogenous coordinates. In the present example the x-y translation between the fiducial pattern image 23 and the fiducial pattern image model 25 are know values and the x-y-translation of the optical detector 3, the part displacement 18, the unknown values. By this means the part position finder 6 calculates the optical detector 3 translation and thereby also the optical detector 3 new position. This optical detector 3 displacement is an error that can be used to compensate for the e.g. the part displacements 8, as e.g. described in examples 1 and 2.

Example 4

FIG. 2 is a schematic drawing illustrating, by way of example, a machine that may represent any machine such as a milling machine, drilling machine, Die sinking EDM (Electrical Discharge Machine), Wire EDM, or similar. This schematic drawing also illustrates generally, by way of example, one example of a machine that represents any quality control machine where the work tool 9 may be for example either a touch probe as in a CMM (Coordinate Measuring Machine), or an optical vision sensor, or similar. These machines can be equipped with a range of different mechanical configurations, but all can be equipped with an apparatus according to the present invention. Some key elements of these machines are indicated as a work piece carrier 100 (typically performing 2 orthogonal translations x and y), a work tool carrier 101 (typically performing one translation in the z direction, but sometimes also one or several additional rotations), a work tool chuck 102, position encoders 103A, 103B, and a support structure. The support structure is in this example indicated to include a work piece support 104, a machine support link 105, and a work tool support 106. The purpose of this machine is to perform machining or quality control of the work piece 8 by means of the work tool 9. In this example the work tool 9 is fastened to the work tool chuck 102. The work tool 9 can be a machining tool, spark erosion tool, mechanical sensor, position stylus sensor, optical imaging sensor, microscope, or similar. An area of the work piece 8, to be machined or quality controlled, we shall call the work area 10. Moving the work tool 9 relative to the work piece 8, by means of the work tool carrier 101 and the work piece carrier 100, performs displacements necessary for the machining or quality control processes to take place. During process the position of these carriers is read at the locations of the position encoders 103A, 103B. In order to position the work piece 8, and thereby the work area 10, relative to the work tool 9, the work piece 8 is placed in a work holder 11. Typically, the work holder 11 is firmly fastened to the work piece carrier 100. A work holder 11 may typically consist of a work holder support 12, a work holder clamp 13, and work locators 2A, 2B, 2C. By placing the work piece 8 against the work locators 2A, 2B, 2C, and by clamping it by use of the work holder clamp 13, the work piece 8 is securely fastened to the work holder 11.

In this example, a problem to be dealt with can be stated as follows. In relation to what has been described above, however, one key problem is that the position encoders 103A and 103B are mounted at a distance away from the locations of the work area 10 and the work tool 9 tip, and for example, due to an unknown angular error, may not be reading the correct positions of the work tool 9 or the work piece area 10. As a consequence both thermal and mechanical forces may cause the position of the machine support link 105 to slightly change or vary during operations of the machining or quality control. In the present example we shall assume that the machine support link 105 might move relative to the work piece support 104.

Accordingly, details regarding the first machine part 20; the second machine part 21; the fiducial pattern 1; the optical detector 3; the fiducial pattern image 14 and machine position 17 should be provided. The reduction of the position errors is accomplished by recording optical images of fiducial patterns, as exemplified in FIG. 2 where an optical detector 3 records the fiducial pattern images 14 of the three fiducial patterns 1E and relays them to the a part position finder 6. The optical detector is a 2 dimensional array camera. The optical detector 3 is by means of the optical assembly 4 and the bracket 107 fastened to the work tool carrier 101. The part position finder 6 can be embodied as process within a computer, personal computer, dedicated processor, or similar. The fiducial pattern images 14 are by known means converted/digitized and will be available for computer position calculation. In FIG. 2 by generality the three fiducial patterns 1E are, as an example, distributed as the given surface structure of three different machine parts, the work piece carrier 100, the work holder support 12, and the work holder clamp 13, or alternatively three patterned labels applied to the three different surfaces. Through the optical paths 5E (not shown in FIG. 2, but similar to three shifted versions of the indicated optical path 5A) the fiducial patterns 1E are optically imaged to the optical detector 3. The same fiducial patterns 1E are also via the work piece support 104 mechanically interlinked to the other parts of the machine. In order to improve machine performance two fiducial pattern images 14 of each of the fiducial patterns 1E are recorded. A first fiducial pattern image 23 of each of the fiducial patterns 1E are recorded to represent three reference states. After the machine has been in use for a while a second fiducial pattern image 24 of each of the fiducial patterns 1E are recorded. The part position finder 6 records, simultaneously with the respective recordings of the fiducial pattern images 23 and 24, the corresponding machine position data 17. The machine position data 17 are the positions of the machine position encoders 103A and 103B. The purpose of the part position finder 6 is to deduce what the position, or position displacement, of important machine parts are. For this purpose the part position finder 6 takes part geometry relations 15 and part displacement constraints 16 into account.

Accordingly, details regarding part geometry relations 15 and part displacement constrains 16 should be provided. The part geometry relations 15 are entered into the part position finder 6 by the means of a keyboard. The diagram in FIG. 3 shows the part geometry relations 15 represented as the mechanical (fully drawn lines) and optical (dashed lines) interlinks between coordinate frames (rectangular boxes). This diagram in FIG. 3 is one representation of the physical arrangement of FIG. 2 where a moderate selected number of parts are taking into account. A coordinate frame represents the position, included orientation, of a part relative to another part. The part displacement constraints 16 are also entered into the position finder 6 by the means of the keyboard. The part displacement constraints 16 define what part displacement degrees of freedom that are allowed in finding a new part position, included their maximum amount/magnitude. By taking the part displacement constraints 16 into account the part position finder 6 finds the position displacement of parts with a minimum of position recording effort. In the present example we assume that the relative position between the machine support link 105 and the work piece support 104 is, for one reason or the other, changing. We assume in the present example that the x-y-position (in the horizontal plane) of first and second fiducial pattern images 23 and 24 of the fiducial patterns 1E are recorded. Then according to our presumption a simple part displacement constraints 16 is that the machine support link 105 is the only part that is allowed to move, and that the only displacements degrees of freedom that are allowed are the y-translation and rotation around the y-axis of this machine support link 105. With this information the part position finder 6 will find the new machine support link 105 position on the basis of only one second image 24 recording of the three fiducial patterns 1E.

Now, part position finder initial condition; combining 14, 15, 16, 17 and ensuring loop consistency are elucidated. As a starting point for calculating a part displacement 18, i.e. the new machine support link 105 position relative to the work piece support 104, the part position finder 6 ensures that all relevant initial conditions of the part geometry relations 15 are consistent with each others. This is accomplished by recording the first fiducial pattern images 23 of the fiducial patterns 1E. These first fiducial pattern images 23, and corresponding machine position data 17, are recorded into the proper reference frames of the part geometry relations 15. I.e. the position encoder 103A data are added to the position of the work piece reference frame 100 (FIG. 3), representing the work piece carrier 100 position relative to the work piece support 104. Likewise the position encoder 103B data are added to the position of the frame 101 (FIG. 3), representing the work tool carrier 101 position relative to the work tool support 106. Finally the three different first fiducial pattern images 23 of the fiducial pattern 1E are added to the optical detector 3 frame (see FIG. 3). This ensures that the initial part geometry relations 15 are consistent with each others for three different carriers positions, i.e. for example for these three positions all coordinate frames reproduce correctly any spatial position within the geometry, and especially that the calculation of a position through any closed loop of a part geometry relations 15 replicates itself. As the machine is changing its condition the different second fiducial pattern images 24 of the fiducial patterns 1E, and the corresponding new machine position data 17, are fed into the part geometry relations 15 of the part position finder 6 in the same manner as described above.

Now, fiducial pattern image displacement is elucidated. For the three different fiducial patterns 1E the part position finder 6 calculates the x-y-translation between the first fiducial pattern image 23 and the corresponding second fiducial pattern image 24. In this example we assume that the translation calculation is carried out by the means of mathematical correlation. I.e. the part position finder 6 repeatedly stepwise translates in the x- and y-directions the corresponding first image 23 compared to the second image 24, calculates the correlation, and finds the translation where the correlation is at its maximum. The correlation is calculated as the product of the gray level numbers for corresponding image pixel positions, then calculating the sum of the products over the image overlap In the following, how to find part displacement 18; loop calculation is described. The fiducial patterns 1E are via the work piece carrier 100 mechanically interlinked to the work piece support 104, machine support link 105, work tool support 106, work tool carrier 101, bracket 107, and optical assembly 4. The fiducial patterns 1E are via the three different optical paths 5E (not shown in FIG. 2) also optically interlinked to the optical detector 3. Since the position relations between the work holder clamp 13, work holder support 12, and the work piece carrier 100 in the present example are assumed to not change, we refer all three fiducial patterns 1E to the work piece carrier 100 coordinate frame. This creates three versions of what we call a loop(3-100-104-105-106-101-107-4-3). The part position finder 6 finds the machine support link 105 displacements by ensuring that separately all the frame positions in these three loops are consistent with each other. By starting with a given position, and calculating the positions mapped through a certain closed loop in the diagram of FIG. 3, we know that we should come back to the same position. I.e. one key purpose of the part position finder 6 of this invention is to ensure that, when positions are mapped through the whole loop, all positions that are members of a given closed loop should map back on to themselves. If the machine support link 105 has moved in between the recording of the first fiducial pattern image 23 and the second fiducial pattern image 24 then the frame positions in each of the three loops(3-100-104-105-106-101-107-4-3) are no longer consistent with each other. The part position finder 6 then applies the part displacement constraint 16 that only the frame representing the machine support link 105 is allowed to move in the horizontal plane (i.e. the y-directions) and rotate around the same y-axis. Except for the carrier 103A and 103B displacements, taken care of by the machine position data 17, all other frames are assumed to have not moved.

Accordingly, a mathematical solution to the loop calculation is developed. In the present example the x-y displacement between the three pairs of fiducial pattern images 23 and 24 are know displacements and the y-translation shift and y-rotation of the machine support link 105, the part displacement 18, the unknown displacements. By this means the part position finder 6 calculates the machine support link 105 displacement and thereby also the machine support link 105 new position.

The mathematical problem of ensuring consistency is accomplished by iteratively changing the unknown part displacements by small amounts, checking whether the second fiducial pattern image 24 positions approaches or moves away from the corresponding found translated positions, and then repeatedly changing the unknown displacements in the direction of diminishing fiducial pattern image 24 position offsets until the offsets are reduced down to a minimum, or below a small threshold limit. Advanced versions of this last approach are well known from the iterative approach used by most lens design programs. There the collection of ray position offset values in the image plane, a merit function, is iteratively reduced by repeatedly changing lens surface curvatures, distances, etc., until the collection of ray position offset values are reduced down to a minimum, or below a small threshold limit. See e.g. the book Modern Lens Design by Warren J. Smith (Publisher: McGraw-Hill Professional Engineering, Two Penn Plaza; New York; ISBN 0-07-143830-0). By analogy, in the present example we identify the image offset values with the ray position offset values, and create a merit function that is the squared sum of the fiducial pattern image 24 offset values. By analogy we also identify the unknown machine support link 105 y-translation and y-rotation with the lens surface curvatures, distances, etc. As a consequence we find the new machine support link 105 position that best fit the observed second fiducial pattern image 24 translations relative to the corresponding fiducial pattern 23 positions.

As a consequence we improve the part geometry relations 15 with the updated new position of the machine support link 105. Especially, by using these new modified part geometry relations 15, represented by the corresponding frame relations illustrated in FIG. 3, this new machine support link 105 position is automatically taken into account to improve the determination of the work area position 10. It is also automatically taken into account to improve the position determination of all other frames that are interlinked to the present loop(3-100-104-105-106-101-107-4-3). As seen from FIG. 3 we note that in the present example the position determination of the frame representing the work tool 9 is improved, even though the work tool 9 is not a member of the loop(3-100-104-105-106-101-107-4-3).

Example 5

FIG. 2 is a schematic drawing illustrating, by way of example, a machine that may represent any machine such as a milling machine, drilling machine, Die sinking EDM (Electrical Discharge Machine), Wire EDM, or similar. This schematic drawing also illustrates generally, by way of example, one example of a machine that represents any quality control machine where the work tool 9 may be for example either a touch probe as in a CMM (Coordinate Measuring Machine), or an optical vision sensor, or similar. These machines can be equipped with a range of different mechanical configurations, but all can be equipped with an apparatus according to the present invention. Some key elements of these machines are indicated as a work piece carrier 100 (typically performing 2 orthogonal translations x and y), a work tool carrier 101 (typically performing one translation in the z direction, but sometimes also one or several additional rotations), a work tool chuck 102, position encoders 103A, 103B, and a support structure. The support structure is in this example indicated to include a work piece support 104, a machine support link 105, and a work tool support 106. The purpose of this machine is to perform machining or quality control of the work piece 8 by means of the work tool 9. In this example the work tool 9 is fastened to the work tool chuck 102. The work tool 9 can be a machining tool, spark erosion tool, mechanical sensor, position stylus sensor, optical imaging sensor, microscope, or similar. An area of the work piece 8, to be machined or quality controlled, we shall call the work area 10. Moving the work tool 9 relative to the work piece 8, by means of the work tool carrier 101 and the work piece carrier 100, performs displacements necessary for the machining or quality control processes to take place. During process the position of these carriers is read at the locations of the position encoders 103A, 103B. In order to position the work piece 8, and thereby the work area 10, relative to the work tool 9, the work piece 8 is placed in a work holder 11. Typically, the work holder 11 is firmly fastened to the work piece carrier 100. A work holder 11 may typically consist of a work holder support 12, a work holder clamp 13, and work locators 2A, 2B, 2C. By placing the work piece 8 against the work locators 2A, 2B, 2C, and by clamping it by use of the work holder clamp 13, the work piece 8 is securely fastened to the work holder 11.

In this example, a problem to be dealt with can be stated as follows. In relation to what has been described above, however, one key problem is that the position encoders 103A and 103B are mounted at a distance away from the locations of the work area 10 and the work tool 9 tip, and for example, due to unknown angular errors, may not be reading the correct positions of the work tool 9 or the work piece area 10. As a consequence, the clamping process and both thermal and mechanical forces may cause the location of the work piece 8, relative to the location of the work tool 9 position, to slightly change or vary during operations of the machining or quality control. In the present example we shall assume a combined displacement where the work piece 8 might translate, relative to the work holder support 12, orthogonal (x-y-directions) to the detector 3 direction of observation, and that the machine support link 105 might rotate around the y-axis and translate parallel to the y-direction to partially cause the detector 3 to move parallel (z-direction) and orthogonal (y-direction) to the detector 3 direction of observation.

Accordingly, details regarding the first machine part 20; the second machine part 21; the fiducial pattern 1; the optical detector 3; the fiducial pattern image 14 and machine position 17 should be provided. The reduction of the position errors is accomplished by recording optical images of fiducial patterns, as exemplified in FIG. 2 where an optical detector 3 records the fiducial pattern image 14 of the fiducial pattern 1A and relays it to the a part position finder 6. The optical detector is a 2 dimensional array camera. The optical detector 3 is by means of the optical assembly 4 and the bracket 107 fastened to the work tool carrier 101. The part position finder 6 can be embodied as process within a computer, personal computer, dedicated processor, or similar. The fiducial pattern images 14 are by known means converted/digitized and will be available for computer position calculation. In FIG. 2 the fiducial pattern 1A is, as an example, the given surface structure of the work piece 8, or alternatively a patterned label applied to the surface. Through the optical path 5A the fiducial pattern 1A is optically imaged to the optical detector 3. The same fiducial pattern 1A is also via the work piece 8 and the locators 2A, 2B, 2C mechanically interlinked to other parts of the machine. In order to improve machine performance both two fiducial pattern images 14 of the fiducial pattern 1A in a first optical configuration of the optical assembly 4 is recorded and another two fiducial pattern images 14 of the fiducial pattern 1A in a second optical configuration of the optical assembly 4 is recorded. The first optical assembly 4 configuration is arranged to be sensitive to displacements orthogonal to the optical detector 3 direction of observation. The second optical assembly 4 configuration is arranged to be sensitive to displacements parallel to the optical detector 3 direction of observation. In the beginning a first fiducial pattern image 23 in the first optical assembly 4 configuration, and a first fiducial pattern image 23 in the second optical assembly 4 configuration, is recorded to represent two reference states. After the machine has been in use for a while a second fiducial pattern image 24 is recorded in both optical configurations.

The part position finder 6 records, simultaneously with the respective recordings of the fiducial pattern images 23 and 24, the corresponding machine position data 17. The machine position data 17 are the positions of the machine position encoders 103A and 103B. The purpose of the part position finder 6 is to deduce what the position, or position displacement, of important machine parts are. For this purpose the part position finder 6 takes part geometry relations 15 and part displacement constraints 16 into account.

Accordingly, details regarding part geometry relations 15 and part displacement constrains 16 should be provided. The part geometry relations 15 are entered into the part position finder 6 from another computer or processor, like for example a CNC (Computer Numerical Control) unit of the machine. The diagram in FIG. 3 shows the part geometry relations 15 represented as the mechanical (fully drawn lines) and optical (dashed lines) interlinks between coordinate frames (rectangular boxes). This diagram in FIG. 3 is one representation of the physical arrangement of FIG. 2 where a moderate selected number of parts are taking into account. A coordinate frame represents the position, included orientation, of a part relative to another part. The part displacement constraints 16 are also entered into the position finder 6 from another computer or processor, like for example the CNC (Computer Numerical Control) unit of the machine. The part displacement constraints 16 define what part displacement degrees of freedom that are allowed in finding new part positions, included their maximum amount/magnitude. By taking the part displacement constraints 16 into account the part position finder 6 finds the position displacement of parts with a minimum of position recording effort. In the present example we assume that the relative position between both the work holder 12 and the work piece 8 and between the machine support link 105 and the work piece support 104 is, for one reason or the other, changing. We assume in the present example that the first and second fiducial pattern images 23 and 24 of the fiducial pattern 1A are recorded both in the first and second optical assembly 4 configuration. Then according to our presumption the part displacement constraints 16 are that both the work piece 8 and the machine support link 105 are the parts that are allowed to move, and that the only displacements degrees of freedom that are allowed are the orthogonal to the optical detector 3 direction of observation x- and y-translations of the work piece 8 and the y-rotation and y-translation of the machine support link 105. To make the example even more realistic we also assume that earlier we have, by simulation or measurement, found that there is a coupling proportionality between the y-rotation and y-translation of the machine support link 105. This proportionality coupling we also include in the part displacement constraints 16. With this information the part position finder 6 can find both the new work piece 8 and machine support link 105 position.

Now, part position finder initial condition; combining 14, 15, 16, 17 and ensuring loop consistency are elucidated. As a starting point for calculating a part displacement 18, i.e. the new work piece 8 position relative to the work holder support 12, and the new machine support link 105 position relative to the work piece support 104, the part position finder 6 ensures that all relevant initial conditions of the part geometry relations are consistent with each others. This is accomplished for the two different optical assembly 4 configurations by recording two different first fiducial pattern images 23 of the fiducial pattern 1A, where the first of the first fiducial pattern images 23 is created by the first optical assembly 4 configuration of evenly illuminating the fiducial pattern 1A and the other optical assembly 4 configuration of the first fiducial pattern images 23 is created by illumination the fiducial pattern 1A with structured light at an angle to the direction of observation. The last configuration creates optical detector 3 position sensitivity parallel to the direction of observation. These first fiducial pattern images 23, and corresponding machine position data 17, are fed into the proper reference frames of the part geometry relations 15. I.e. the position encoder 103A data are added to the position of the work piece reference frame 100 (FIG. 3), representing the work piece carrier 100 position relative to the work piece support 104. Likewise the position encoder 103B data are added to the position of the frame 101 (FIG. 3), representing the work tool carrier 101 position relative to the work tool support 106. Finally the two different first fiducial pattern images 23 of the fiducial pattern 1A are added to the optical detector 3 frame (see FIG. 3). This ensures that the initial part geometry relations 15 are consistent with each others for two different optical configurations, i.e. for example all coordinate frames reproduce correctly any spatial position within the geometry, and especially that the calculation of a position through any closed loop of a part geometry relations 15 replicates itself. As the machine is changing its condition the different second fiducial pattern images 24 of the fiducial pattern 1A, corresponding to the two different optical assembly 4 configurations, and the corresponding new machine position data 17, are fed into the part geometry relations 15 of the part position finder 6, in the same manner as described above.

Now, fiducial pattern image displacement is elucidated. For the two different optical configurations the part position finder 6 calculates the x-y-translation between the corresponding first fiducial pattern image 23 and the second fiducial pattern image 24 of the fiducial pattern 1A. In this example we assume that the displacement calculation is carried out by the means of mathematical correlation. I.e. the part position finder 6 repeatedly stepwise translates in the x- and y-directions the corresponding first image 23 compared to the second image 24, calculates the correlation, and finds the translation where the correlation is at its maximum. The correlation is calculated as the product of the gray level numbers for corresponding image pixel positions, then calculating the sum of the products over the image overlap. For the images recorded with the second optical assembly 4 configuration the x-y-translation of the structured light illumination distribution, as it is reflected from the fiducial pattern 1A, is observed as an image translation between the first fiducial pattern image 23 and the second fiducial pattern image 24. By known optical techniques of optical triangulation this x-y-translation is by calculation converted from an in-the-image-plane (x-y-) translation to an along-the-direction-of-observation (z-) translation.

In the following, how to find part displacement 18; loop calculation is described. The fiducial pattern 1A of the work piece 8 is via the work holder support 12 mechanically interlinked to the work piece carrier 100, the work piece support 104, machine support link 105, work tool support 106, work tool carrier 101, bracket 107, and optical assembly 4. The fiducial pattern 1A is via the optical path 5A also optically interlinked to the optical detector 3. This creates what we call a loop(3-8-12-100-104-105-106-101-107-4-3). The part position finder 6 finds the work piece 8 and the machine support link 105 displacements by ensuring that all the frame positions in this loop are consistent with each other. By starting with a given position, and calculating the positions mapped through a certain closed loop in the diagram of FIG. 3, we know that we should come back to the same position. I.e. one key purpose of the part position finder 6 of this invention is to ensure that, when positions are mapped through the whole loop, all positions that are members of a given closed loop should map back on to themselves. If the machine support link 105 has moved in between the recording of the first fiducial pattern image 23 and the second fiducial pattern image 24 then the frame positions of the loop(3-8-12-100-104-105-106-101-107-4-3) are no longer consistent with each other. The part position finder 6 then applies the part displacement constraint 16 that only the frame representing the work piece 8 is allowed to translate in the horizontal plane x- and y-directions and the frame representing the machine support link 105 is allowed to translate in the horizontal plane (i.e. the y-directions) and rotate around the same y-axis. Except for the carrier 103A and 103B displacements, taken care of by the machine position data 17, all other frames are assumed to have not moved.

Accordingly, a mathematical solution to the loop calculation is developed. In the present example the x-y displacement between fiducial pattern images 23 and 24, recorded in the first optical assembly 4 configuration, and the z-displacement, recorded in the second optical assembly 4 configuration, are know displacements. The x- and y-translation of the work piece 8, and the coupled y-translation and y-rotation of the machine support link 105, are the unknown part displacements 8.

The mathematical problem of ensuring consistency is accomplished by iteratively changing the unknown part displacements by small amounts, checking whether the second fiducial pattern image 24 positions approaches or moves away from the corresponding found displaced positions, and then repeatedly changing the unknown displacements in the direction of diminishing fiducial pattern image 24 position offsets until the offsets are reduced down to a minimum, or below a small threshold limit. Advanced versions of this last approach are well known from the iterative approach used by most lens design programs. There the collection of ray position offset values in the image plane, a merit function, is iteratively reduced by repeatedly changing lens surface curvatures, distances, etc., until the collection of ray position offset values are reduced down to a minimum, or below a small threshold limit. See e.g. the book Modern Lens Design by Warren J. Smith (Publisher: McGraw-Hill Professional Engineering, Two Penn Plaza; New York; ISBN 0-07-143830-0). By analogy in the present example we identify the image x-y and z-offset values with the ray position offset values, and create a merit function that is the squared sum of these fiducial pattern image 24 offset values. By analogy we also identify the unknown work piece 8 x-y-translation and the machine support link 105 y-translation and y-rotation with the lens surface curvatures, distances, etc. As a consequence we find the new work piece 8 and the new machine support link 105 positions that best fit the observed second fiducial pattern image 24 displacements relative to the corresponding fiducial pattern 23 positions.

Example 6

Figure 4:
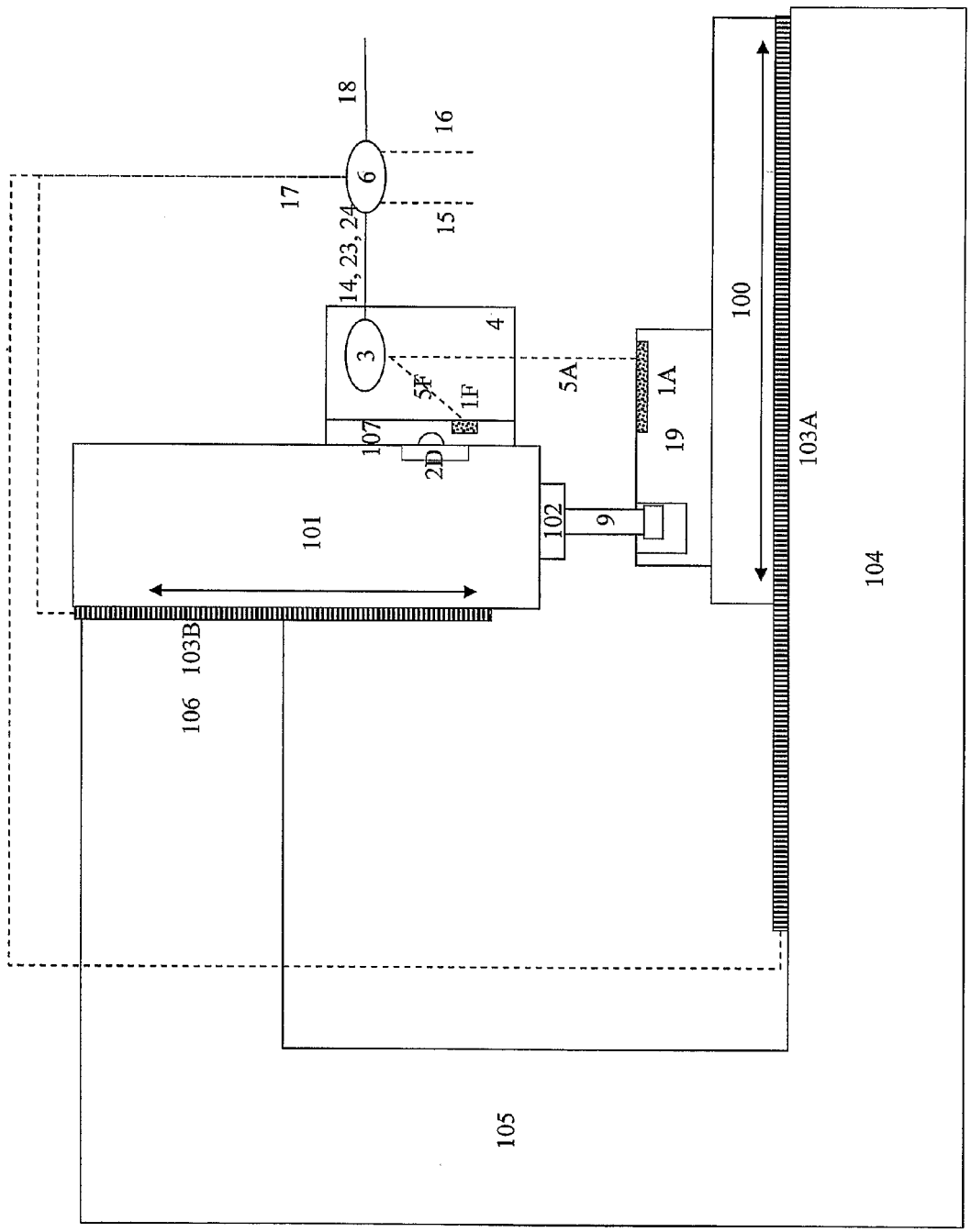
FIG. 4 is a schematic drawing illustrating generally one example of a machine, representing any machine such as a milling machine, drilling machine, Die sinking EDM (Electrical Discharge Machine), or similar, and how this example via the fiducial pattern 1A refers a local work tool 9 tip position to optical detector 3 positions by means of a gauge tool 19.

FIG. 4 is a schematic drawing illustrating, by way of example, a machine that may represent any machine such as a milling machine, drilling machine, Die sinking EDM (Electrical Discharge Machine), Wire EDM, or similar. These machines can be equipped with a range of different mechanical configurations, but all can be equipped with an apparatus according to the present invention. Some key elements of these machines are indicated as a work piece carrier 100 (typically performing 2 orthogonal translations x and y), a work tool carrier 101 (typically performing one translation in the z direction, but sometimes also one or several additional rotations), a work tool chuck 102, position encoders 103A, 103B, and a support structure. The support structure is in this example indicated to include a work piece support 104, a machine support link 105, and a work tool support 106. The purpose of this machine is to perform machining or quality control of the work piece 8 by means of the work tool 9. In this example the work tool 9 is fastened to the work tool chuck 102. The work tool 9 is a machining tool. An area of the work piece 8 to be machined we shall call the work area 10. Moving the work tool 9 relative to the work piece 8, by means of the work tool carrier 101 and the work piece carrier 100, performs displacements necessary for the machining to take place. During process the position of these carriers is read at the locations of the position encoders 103A, 103B. In order to position the work piece 8, and thereby the work area 10, relative to the work tool 9, the work piece 8 is placed in a work holder 11. Typically, the work holder 11 is firmly fastened to the work piece carrier 100. A work holder 11 may typically consist of a work holder support 12, a work holder clamp 13, and work locators 2A, 2B, 2C. By placing the work piece 8 against the work locators 2A, 2B, 2C, and by clamping it by use of the work holder clamp 13, the work piece 8 is securely fastened to the work holder 11.

In this example, a problem to be dealt with can be stated as follows. This example illustrates how to refer the work tool 9 tip location to positions of the optical detector 3 by means of a gauge tool 19, thereby determining the exact location of the work tool 9 tip. Here, the gauge tool 19 may reside permanently inside the machine, but outside the work area, or be temporarily placed in the machine for the purpose of tool 9 position control. One key problem is that the work tool 9 tips are produced with tolerance differences and that the tips wear down during machining. This results in machining errors. In the present example we assume that the gauge tool 19 is placed mounted so that it is allowed to slightly translate in the +/−x and +/−y directions by for example spring-loading it in those directions. By use of the machines translation degrees of freedom (for example x, y, and z) the work tool 9, such as a milling or drilling tool, can be translated to make the tool tip touch a vertical plane inside the gauge tool 19. If the gauge tool 19 is made to slightly move towards the springs there will be established a given distance between the tip touch point and the fiducial pattern 1A. When the gauge tool 19 is not spring loaded it will rest against a well defined position stop.

Accordingly, details regarding the first machine part 20; the second machine part 21; the fiducial pattern 1; the optical detector 3; the fiducial pattern image 14 and machine position 17 should be provided. The reduction of the work tool 9 tip location errors is accomplished by recording optical images of fiducial patterns, as exemplified in FIG. 4 where an optical detector 3 records the fiducial pattern image 14 of the fiducial pattern 1A and relays it to the a part position finder 6. The optical detector is a 1 dimensional array camera. The optical detector 3 is by means of the optical assembly 4 and the bracket 107 fastened to the work tool carrier 101. The part position finder 6 is electronically hard wired to perform the part position 6 operations. The fiducial pattern images 14 are by known means converted/digitized and will be available for part position finder 6 operations. In FIG. 2 the fiducial pattern 1A is, as an example, the given surface structure of the gauge tool 19, or alternatively an extended patterned label applied to its surface. Through the optical path 5A the fiducial pattern 1A is optically imaged to the optical detector 3. The same fiducial pattern 1A is also via the gauge tool 19 mechanically interlinked to other parts of the machine. In order to improve machine performance two fiducial pattern images 14 of the fiducial pattern 1A is recorded. To represent a reference state a first fiducial pattern image 23 is recorded when the work tool 9 tip is close to a gauge tool 19 surface, but not touching it. After the work piece carrier 100 is translated, to make the work tool tip slightly translate the gauge tool 19, a second fiducial pattern image 24 is recorded. The part position finder 6 records, simultaneously with the respective recordings of the fiducial pattern images 23 and 24, the corresponding machine position data 17. The machine position data 17 are the positions of the machine position encoders 103A and 103B. The purpose of the part position finder 6 is to deduce what the position, or position displacement, of the work tool 9 tip is. For this purpose the part position finder 6 takes part geometry relations 15 and part displacement constraints 16 into account.

Figure 5:
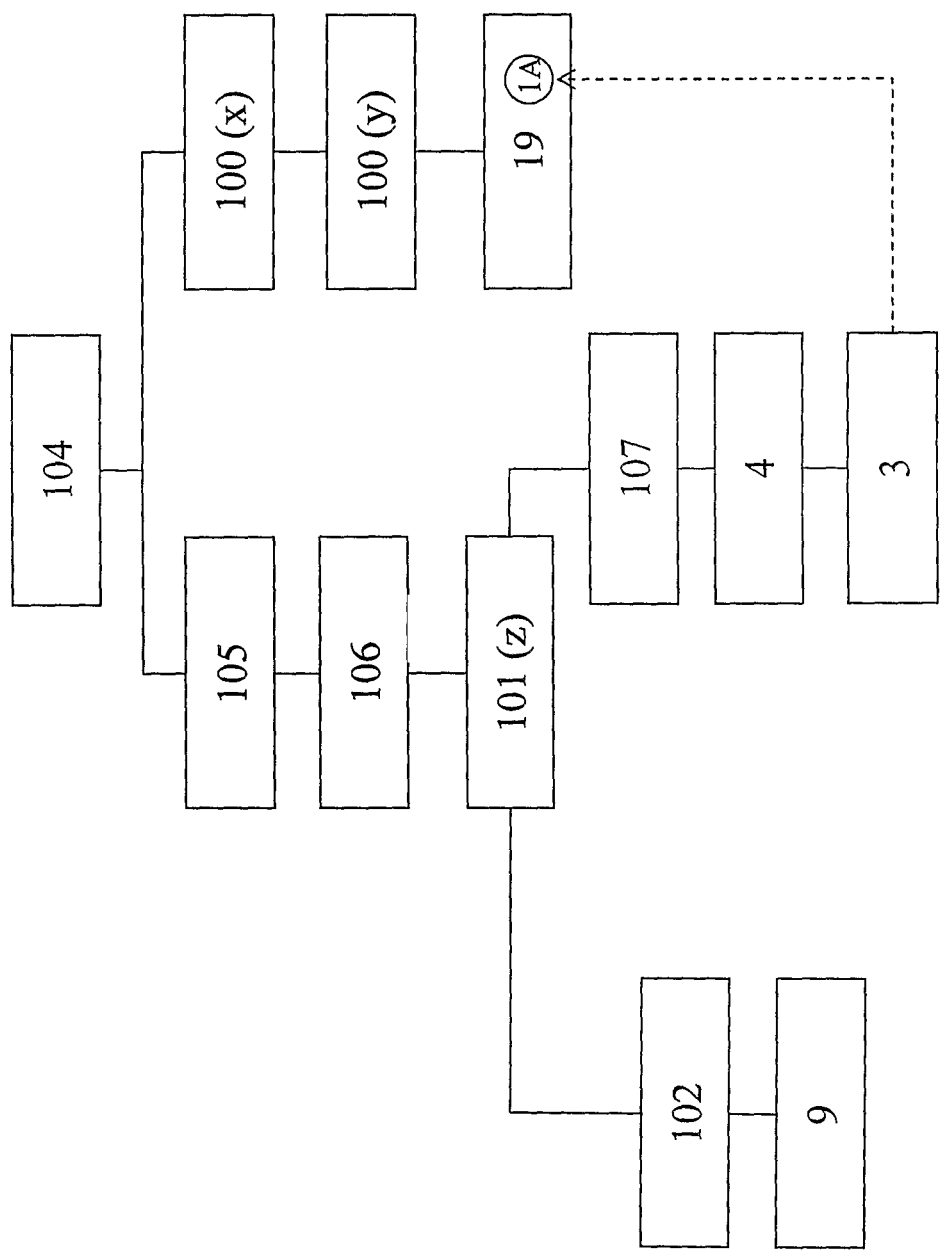
FIG. 5 is a schematic diagram where selected parts of the machine illustrated in FIG. 4 are represented by coordinate reference frames, and where the lines represent mechanical (solid) and optical (dotted) interlinks. In this figure the rectangular boxes represent coordinate reference frames. The solid lines between the boxes represent mechanical interlinks and the dotted lines optical interlinks/paths. The small circle represent a larger fiducial pattern 1A area on the gauge tool 19. The inclusion of an optical detector 3 and fiducial patterns 1A help create what we shall call closed loops of reference frames making it possible to find the position of parts that are related to certain loops.

Accordingly, details regarding part geometry relations 15 and part displacement constrains 16 should be provided. The part geometry relations 15 have been earlier hard wired into the part position finder 6 electronic device. The diagram in FIG. 5 shows the part geometry relations 15 represented as the mechanical (fully drawn lines) and optical (dashed lines) interlinks between coordinate frames (rectangular boxes). This diagram in FIG. 5 is one representation of the physical arrangement of FIG. 4 where a moderate selected number of parts are taking into account. A coordinate frame represents the position, included orientation, of a part relative to another part. The part displacement constraints 16 have been earlier hard wired into the part position finder 6 electronic device. The part displacement constraints 16 define what part displacement degrees of freedom that are allowed in finding new part positions, included their maximum amount/magnitude. By taking the part displacement constraints 16 into account the part position finder 6 finds the position displacement of parts with a minimum of position recording effort. In the present example we assume that the relative position between the gauge tool 19 and the work tool 9 tip is deliberately changed. We assume in the present example that the x-position (in the horizontal plane and paper plane direction) of first and second fiducial pattern images 23 and 24 of the fiducial pattern 1A is recorded. Then according to our presumption a simple part displacement constraint 16 is that the gauge tool 19 is the only part that is allowed to move, and that the only displacements degree of freedom that is allowed is the x-translation of the gauge tool 19. With this information the part position finder 6 can find the new gauge tool 19 position on the basis of only one second recording of the fiducial pattern 1A. By use of calibrated distances, to be described below, the work tool 9 tip position can be extracted.

Now, part position finder initial condition; combining 14, 15, 16, 17 and ensuring loop consistency are elucidated. As a starting point for calculating a part displacement 18, i.e. the new gauge tool 19 position relative to the work piece carrier 100, the part position finder 6 ensures that all relevant initial conditions of the part geometry relations are consistent with each others. This is accomplished by recording the first fiducial pattern image 23 of the fiducial pattern 1A, and corresponding machine position data 17, into the proper reference frames of the part geometry relations 15 of a memory location of the part position finder 6. In addition the exact distance from the fiducial pattern 1A to the gauge tool 19 surface, where the work tool tip is touching the gauge tool 19, is independently calibrated and recorded to the corresponding frame. That calibration distance is recorded by means of a calibration machine. In practice a range of first fiducial pattern images 23, and corresponding calibrated distances to corresponding fiducial patterns 1A, are earlier recorded into a memory location of the hard wire version of the part position finder 6. In addition the position encoder 103A data are added to the position of the work piece reference frame 100 (FIG. 3), representing the work piece carrier 100 position relative to the work piece support 104. Likewise the position encoder 103B data are added to the position of the frame 101 (FIG. 3), representing the work tool carrier 101 position relative to the work tool support 106. Finally the fiducial pattern image 23 of the fiducial pattern 1A is added to the optical detector 3 frame (see FIG. 3). This ensures that the initial part geometry relations 15 are consistent with each others, i.e. for example all coordinate frames reproduce correctly any spatial position within the geometry, and especially that the calculation of a position through any closed loop of a part geometry relations 15 replicates itself. As the machine is changing its condition the second fiducial pattern image 24 of the fiducial pattern 1A, and the corresponding new machine position data 17, are fed into the part geometry relations 15 of the part position finder 6 in the same manner as described above.

Now, fiducial pattern image displacement is elucidated. The part position finder 6 calculates the x-displacement between the first fiducial pattern image 23 and the second fiducial pattern image 24 of the fiducial pattern 1A. In this example we assume that the displacement calculation is hard wired to carry out a mathematical correlation. I.e. the part position finder 6 is hard wired to repeatedly stepwise translate in the x-directions one image compared to the other, calculate the correlation, and find the translation where the correlation is at its maximum. The correlation is calculated as the product of the gray level numbers for corresponding image pixel positions, then calculating the sum of the products over the image overlap.

In the following, how to find part displacement 18; loop calculation is described. When the first fiducial pattern image 23 was recorded the fiducial pattern 1A was via the gauge tool 19 mechanically interlinked to the optical detector 3 via the work piece carrier 100 (defined by the spring stop position), work piece support 104, machine support link 105, work tool support 106, work tool carrier 101, bracket 107, and optical assembly 4. The fiducial pattern 1A is via the optical path 5A also optically interlinked to the optical detector 3. This creates what we call a the loop(3-19-100-104-105-106-101-107-4-3). When the second fiducial pattern image 24 is recorded the part position finder 6 finds the gauge tool 19 displacements by ensuring that all the frame positions in the new loop(3-19-9-102-101-107-4-3) are consistent with each other. I.e. the translation of the gauge tool 19 by means of the work tool 9 creates a new loop. By starting with a given position, and calculating the positions mapped through a certain closed loop in the diagram of FIG. 3, we know that we should come back to the same position. I.e. one key purpose of the part position finder 6 of this invention is to ensure that, when positions are mapped through the whole loop, all positions that are members of a given closed loop should map back on to themselves. After the gauge tool 19 has moved in between the recording of the first fiducial pattern image 23 and the second fiducial pattern image 24 then the frame positions of the loop(3-19-9-102-101-107-4-3) are no longer consistent with each other. The part position finder 6 then applies the part displacement constraint 16 that only the frame representing the work piece 8 is allowed to move in the horizontal plane (i.e. in the x-directions). Except for the carrier 103A and 103B displacements, taken care of by the machine position data 17, all other frames are assumed to have not moved.

Accordingly, a mathematical solution to the loop calculation is developed. The mathematical problem of ensuring consistency is obtained by solving a set of linear equations, describing the transforms between the different frames. This can be accomplished by use of 4×4 matrices describing the 3 dimensional translation and rotation by means of homogenous coordinates. In the present example the x-translation between the fiducial pattern images 23 and 24 are know values and the x-offset of the work tool 9 tip position, the part displacement 18, the unknown value. By this means the part position finder 6 calculates the work tool 9 tip offset and thereby also the work tool 9 tip new position.

The invention claimed is:

1. A method for finding position relations of parts of a machine, said method comprising creating a first image and a second image of a fiducial pattern of a second machine part or creating a first image and a second image of a plurality of additional patterns of a second machine part, using an optical detector, fastened to a first machine part, receiving in a part position finder said pattern images from said optical detector, receiving part geometry relations, in said part position finder, said part geometry relations describing positional relations between the first machine part, the second machine part, the fiducial patterns, and a third machine part, and positional relations between the first, second and third machine parts and the optical detector, receiving in the part position finder a part displacement constraint, said part displacement constraint describing an allowed degree of freedom of displacement for at least one of said first, second and third machine parts and the optical detector, using said part position to determine a fiducial pattern image displacement between a first fiducial pattern image and a second fiducial pattern image or between a first fiducial pattern and a fiducial pattern image model, using said part position finder to modify, according to said part displacement constraint, at least one of said part geometry relations to determine a new machine part displacement that produces fiducial pattern image displacements corresponding to said determined fiducial pattern image displacements; and using a fiducial pattern cleaning device for cleaning said fiducial pattern by means of air blow, or blow of detergent agency followed by air blow.

2. The method of claim 1, wherein said part displacement is the displacement of one of said first, second or third machine parts, or of the optical detector.

3. The method of claim 1, further comprising adapting said optical detector to be fastened to a work tool carrier.

4. The method of claim 1, further comprising adapting said optical detector to be fastened to a work piece carrier.

5. The method of claim 1, further comprising providing for said optical detector imaging optics adapted to optically resolve a machined or casted fine structure of a surface of said second part.

6. The method of claim 1, wherein an optical path between said fiducial pattern and said optical detector is confined within an optical assembly.

7. The method of claim 1, wherein an optical path between said fiducial pattern and said optical detector is confined within an optical assembly and another optical path between said fiducial pattern and said optical detector is partially external to and partially internal to an optical assembly.

8. The method of claim 1, wherein an optical assembly containing said optical detector is telecentric on the fiducial pattern.

9. The method of claim 1, further comprising illuminated said fiducial pattern with structured light, at an angle to a direction of observation, to create triangulation sensitivity in the direction of observation.

10. The method of claim 1, further comprising providing a plurality of optical detectors and using said optical plurality of optical detectors to create different triangulation pairs of said first image and second image of said fiducial pattern.

11. The method of claim 1, further comprising moving said optical detector from one location to another location and creating different triangulation pairs of said first image and said second image of said fiducial pattern.

12. The method of claim 1, wherein said part position finder comprises a computer, an electronic processor, an embedded processor, or hard wired electronics.

13. The method of claim 1, wherein said part position finder comprises a first input for receiving said fiducial pattern images from said optical detector, a second input for receiving said part geometry relations, and a third input for receiving said part displacement constraint, said first, second and third inputs being distributed on different computers, electronic processors, embedded processors, or hard wired electronics, and wherein said computers, electronic processors, embedded processors or hard wire electronics are being adapted to exchange data when finding said part displacement.

14. The method of claim 1, further comprising finding said displacement of said fiducial pattern image relative to said fiducial pattern image by calculating a displacement for which a degree of correlation is at a maximum.

15. The method of claim 1, further comprising finding said displacement of said fiducial pattern image relative to said fiducial pattern image by calculating a position of a geometrical centroid in both images and deducing said image displacement from said centroid displacement.

16. The method of claim 1, further comprising using said part position finder to recognize a machine part by recording said second image of said fiducial pattern of assumingly the same part, and by calculating a maximum degree of correlation with said first image of that part, and regarding a degree of correlation above a certain threshold to be a recognition.

17. The method of claim 1, further comprising using said part position finder to recognize a machine part among a group of several other parts by a) recording the second image of the fiducial pattern of that part, b) calculating a respective maximum degree of correlation between this second image and each of the first images of the other parts, and then c) regarding the part that gives the maximum degree of correlation to be the one that is recognized.

18. The method of claim 1, wherein the fiducial pattern is a processed surface of at least one of a machine support structure, a work piece, a work tool, a gauge tool, a work holder, an optical detector, or an optical assembly.

19. A method for finding position relations of parts of a machine, said method comprising creating a first image and a second image of a fiducial pattern of a second machine part or creating a first image and a second image of a plurality of additional patterns of a second machine part, using an optical detector, fastened to a first machine part, receiving in a part position finder said pattern images from said optical detector, receiving part geometry relations, in said part position finder, said part geometry relations describing positional relations between the first machine part, the second machine part, the fiducial patterns, and a third machine part, and positional relations between the first, second and third machine parts and the optical detector, receiving in the part position finder a part displacement constraint, said part displacement constraint describing an allowed degree of freedom of displacement for at least one of said first, second and third machine parts and the optical detector, using said part position to determine a fiducial pattern image displacement between a first fiducial pattern image and a second fiducial pattern image or between a first fiducial pattern and a fiducial pattern image model, using said part position finder to modify, according to said part displacement constraint, at least one of said part geometry relations to determine a new machine part displacement that produces fiducial pattern image displacements corresponding to said determined fiducial pattern image displacements; and providing the fiducial pattern with a tag or label device adapted to carry a high contrast pattern, fastened to a machine support structure, work piece, work tool, gauge tool, work holder, optical detector, or optical assembly.

20. The method of claim 1, wherein said fiducial pattern is represented by a range of fiducial patterns being distributed regularly or irregularly over a surface.

21. The method of claim 1, wherein the fiducial pattern is represented by a fiducial pattern created by means of the said machine work tool.

22. The method of claim 1, further comprising making a center of the fiducial pattern to represent a spindle center of the work tool.

23. The method of claim 1, further comprising receiving machine position data in the part position finder by a fourth input.

24. The method of claim 1, further comprising receiving in the part position finder machine position data from a machine computer numerical control unit.

25. The method of claim 1, wherein the part position finder is adapted to control the machine position by an input of the machine position data to the machine computer numerical control unit.

26. The method of claim 1, wherein the part position finder having an input for receiving the machine position data from a keyboard or keypad unit.

27. The method of claim 1, further comprising fastening the optical detector to either the tool holder, work piece holder, or a support structure of said machine.

28. The method of claim 1, further comprising inputting the part geometry relations by means of a keyboard or a keypad.

29. The method of claim 1, further comprising preprogramming the part geometry relations into a computer, electronic processor, embedded processor, or hard wired electronics.

30. The method of claim 1, further comprising inputting the part geometry relations from an external computer or processor, especially said machine's computer or processor.

31. The method of claim 1, wherein the part geometry relations are hard wired into a part position finder electronics.

32. The method of claim 1, further comprising inputting a part displacement constraints by means of a keyboard or a keypad.

33. The method of claim 1, further comprising preprogramming the part displacement constraints into a computer, electronic processor, embedded processor, or hard wire electronics.

34. The method of claim 1, further comprising inputting the part displacement constraint from an external computer or processor, especially said machine's computer or processor.

35. The method of claim 1, further comprising hard wiring the part displacement constraints into a part position finder electronics.

36. The method of claim 1, further comprising including with said part geometry relations pre-calibrated machine part and positions of said fiducial pattern.

37. The method of claim 1, further comprising receiving in said part position finder first fiducial pattern images that are recorded by a second optical detector.

38. The method of claim 1, further comprising using said part position finder to combine displacements between said first fiducial pattern image and second fiducial pattern image from several fiducial patterns into a total displacement offset merit function to iteratively determine the part displacement combinations that reduce this merit function to a minimum.

39. A computer program product comprising a computer readable medium having thereon computer readable and computer executable code arranged to adapt a computer means to perform the method according claim 1.

40. A method for finding position relations of parts of a machine, said method comprising creating a first image and a second image of a fiducial pattern of a second machine part or creating a first image and a second image of a plurality of additional patterns of a second machine part, using an optical detector, fastened to a first machine part, receiving in a part position finder said pattern images from said optical detector, receiving part geometry relations, in said part position finder, said part geometry relations describing positional relations between the first machine part, the second machine part, the fiducial patterns, and a third machine part, and positional relations between the first, second and third machine parts and the optical detector, receiving in the part position finder a part displacement constraint, said part displacement constraint describing an allowed degree of freedom of displacement for at least one of said first, second and third machine parts and the optical detector, using said part position to determine a fiducial pattern image displacement between a first fiducial pattern image and a second fiducial pattern image or between a first fiducial pattern and a fiducial pattern image model, using said part position finder to modify, according to said part displacement constraint, at least one of said part geometry relations to determine a new machine part displacement that produces fiducial pattern image displacements corresponding to said determined fiducial pattern image displacements, and using a fiducial pattern cleaning device for cleaning said fiducial pattern by means of air blow, or blow of detergent agency followed by air blow.

41. A method for finding position relations of parts of a machine, said method comprising creating a first image and a second image of a fiducial pattern of a second machine part or creating a first image and a second image of a plurality of additional patterns of a second machine part, using an optical detector, fastened to a first machine part, receiving in a part position finder said pattern images from said optical detector, receiving part geometry relations, in said part position finder, said part geometry relations describing positional relations between the first machine part, the second machine part, the fiducial patterns, and a third machine part, and positional relations between the first, second and third machine parts and the optical detector, receiving in the part position finder a part displacement constraint, said part displacement constraint describing an allowed degree of freedom of displacement for at least one of said first, second and third machine parts and the optical detector, using said part position to determine a fiducial pattern image displacement between a first fiducial pattern image and a second fiducial pattern image or between a first fiducial pattern and a fiducial pattern image model, using said part position finder to modify, according to said part displacement constraint, at least one of said part geometry relations to determine a new machine part displacement that produces fiducial pattern image displacements corresponding to said determined fiducial pattern image displacements, and providing the fiducial pattern with a tag or label device adapted to carry a high contrast pattern, fastened to a machine support structure, work piece, work tool, gauge tool, work holder, optical detector, or optical assembly.

42. A method for finding position relations of parts of a machine, said method comprising creating a first image and a second image of a fiducial pattern of a second machine part or creating a first image and a second image of a plurality of additional patterns of a second machine part, using an optical detector, fastened to a first machine part, receiving in a part position finder said pattern images from said optical detector, receiving part geometry relations, in said part position finder, said part geometry relations describing positional relations between the first machine part, the second machine part, the fiducial patterns, and a third machine part, and positional relations between the first, second and third machine parts and the optical detector, receiving in the part position finder a part displacement constraint, said part displacement constraint describing an allowed degree of freedom of displacement for at least one of said first, second and third machine parts and the optical detector, using said part position to determine a fiducial pattern image displacement between a first fiducial pattern image and a second fiducial pattern image or between a first fiducial pattern and a fiducial pattern image model, using said part position finder to modify, according to said part displacement constraint, at least one of said part geometry relations to determine a new machine part displacement that produces fiducial pattern image displacements corresponding to said determined fiducial pattern image displacements, and using said part position finder to combine displacements between said first fiducial pattern image and second fiducial pattern image from several fiducial patterns into a total displacement offset merit function to iteratively determine the part displacement combinations that reduce this merit function to a minimum.

43. A computer program product comprising a computer readable medium having thereon computer readable and computer executable code arranged to adapt a computer means to perform the method according claim 19.

44. A computer program product comprising a computer readable medium having thereon computer readable and computer executable code arranged to adapt a computer means to perform the method according claim 40.

45. A computer program product comprising a computer readable medium having thereon computer readable and computer executable code arranged to adapt a computer means to perform the method according claim 41.

46. A computer program product comprising a computer readable medium having thereon computer readable and computer executable code arranged to adapt a computer means to perform the method according claim 42.

* * * * *